US012276902B2

(12) United States Patent
Li et al.

(10) Patent No.: US 12,276,902 B2
(45) Date of Patent: Apr. 15, 2025

(54) LASER SOURCE AND PROJECTION APPARATUS

(71) Applicant: Hisense Laser Display Co., Ltd, Qingdao (CN)

(72) Inventors: Wei Li, Qingdao (CN); Wuyue Han, Qingdao (CN); Youliang Tian, Qingdao (CN)

(73) Assignee: HISENSE LASER DISPLAY CO., LTD, Qingdao (CN)

( * ) Notice: Subject to any disclaimer, the term of this patent is extended or adjusted under 35 U.S.C. 154(b) by 128 days.

(21) Appl. No.: 17/730,353

(22) Filed: Apr. 27, 2022

(65) Prior Publication Data

US 2023/0350281 A1 Nov. 2, 2023

Related U.S. Application Data

(63) Continuation of application No. PCT/CN2021/101571, filed on Jun. 22, 2021.

(30) Foreign Application Priority Data

Jun. 22, 2020 (CN) .......................... 202010576393.6

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01); *G03B 21/2066* (2013.01)

(58) Field of Classification Search
CPC .. G03B 21/204; G03B 21/2066; G03B 21/20; G03B 21/2013; G03B 33/08; G03B 21/206; G02B 26/008
See application file for complete search history.

(56) References Cited

U.S. PATENT DOCUMENTS

| 10,368,043 B2 * | 7/2019 | Chiu ................. G02B 27/1006 |
| 2011/0310353 A1 * | 12/2011 | Maeda ............... G03B 21/2033 |
| | | 353/31 |

(Continued)

FOREIGN PATENT DOCUMENTS

| CN | 102929086 A | 2/2013 |
| CN | 104698729 A | 6/2015 |

(Continued)

OTHER PUBLICATIONS

International Search Report and Written Opinion issued in corresponding International Application No. PCT/CN2021/101571 dated Sep. 24, 2021, with English translation.

(Continued)

*Primary Examiner* — Magda Cruz

(74) *Attorney, Agent, or Firm* — Morgan, Lewis & Bockius LLP

(57) ABSTRACT

A laser source includes a light-emitting assembly, a converging lens group, a phosphor wheel and a combining component. The light-emitting assembly is configured to emit a laser beam. The converging lens group is configured to converge the laser beam emitted by the light-emitting assembly. The phosphor wheel includes a fluorescence-exciting region and a laser-reflecting region. The fluorescence-exciting region is configured to generate a fluorescence beam with a color different from the converged laser beam under an excitation of the laser beam. The laser-reflecting region is configured to reflect the converged laser beam to the converging lens group. The combining component is disposed between the light-emitting assembly and the (Continued)

converging lens group. The combining component is configured to reflect the fluorescence beam excited by the phosphor wheel and the laser beam reflected by the phosphor wheel to a beam outlet of the laser source.

17 Claims, 18 Drawing Sheets

(56) References Cited

U.S. PATENT DOCUMENTS

| | | | |
|---|---|---|---|
| 2012/0242912 A1* | 9/2012 | Kitano | F21V 9/08 362/19 |
| 2014/0268069 A1 | 9/2014 | Takahashi et al. | |
| 2014/0285774 A1 | 9/2014 | Tajiri | |
| 2015/0153636 A1 | 6/2015 | Hartwig | |
| 2015/0362830 A1* | 12/2015 | Liao | G03B 21/2066 353/31 |
| 2016/0091785 A1 | 3/2016 | Inoko et al. | |
| 2016/0320692 A1 | 11/2016 | Takahashi et al. | |
| 2016/0327851 A1 | 11/2016 | Liao et al. | |
| 2018/0299757 A1 | 10/2018 | Liao | |
| 2019/0072245 A1 | 3/2019 | Kobayashi et al. | |
| 2019/0211263 A1 | 7/2019 | Maeda et al. | |
| 2019/0285977 A1* | 9/2019 | Tian | G03B 21/2013 |
| 2020/0019049 A1* | 1/2020 | Liu | G02B 27/10 |
| 2020/0073218 A1* | 3/2020 | Yamamoto | G03B 21/204 |
| 2020/0103737 A1 | 4/2020 | Kawasumi | |
| 2020/0341359 A1* | 10/2020 | Hayashi | G03B 21/2073 |

FOREIGN PATENT DOCUMENTS

| | | |
|---|---|---|
| CN | 105093794 A | 11/2015 |
| CN | 105467736 A | 4/2016 |
| CN | 106125475 A | 11/2016 |
| CN | 108732851 A | 11/2018 |
| CN | 109375462 A | 2/2019 |
| CN | 110275373 A | 9/2019 |
| CN | 111025833 A | 4/2020 |
| CN | 111213005 A | 5/2020 |
| JP | 2014-075221 A | 4/2014 |
| JP | 2019-096635 A | 6/2019 |

OTHER PUBLICATIONS

Chinese Office Action dated Nov. 21, 2022, issued in corresponding Chinese Patent Application No. 202010576393.6 with English translation.

Chinese Office Action dated May 27, 2023, issued in corresponding Chinese Patent Application No. 202010576393.6.

U.S. Notice of Allowance dated May 23, 2023, issued in corresponding U.S. Appl. No. 17/725,868.

Office Action issued on Mar. 7, 2024 in U.S. Appl. No. 17/729,489.

* cited by examiner

- - - → Laser beam

LASER SOURCE AND PROJECTION APPARATUS

CROSS-REFERENCE TO RELATED APPLICATIONS

This application is a continuation application of International Application No. PCT/CN2021/101571, filed on Jun. 22, 2021, which claims priority to Chinese Patent Application No. 202010576393.6, filed on Jun. 22, 2020, which are incorporated herein by reference in their entireties.

TECHNICAL FIELD

The present disclosure relates to the field of laser projection technologies, and in particular, to a laser source and a projection apparatus.

BACKGROUND

Fluorescence emitted by laser-excited fluorescent materials is used as a projection laser source, which has advantages of good monochromaticity, high brightness and long life. The fluorescence is an ideal laser source and is widely used in laser projection apparatuses such as laser television or laser projector. The laser source is an important portion of the laser projection apparatuses, and is used to provide illumination beams.

SUMMARY

In an aspect, a laser source is provided. The laser source includes a light-emitting assembly, a converging lens group, a phosphor wheel and a combining component. The light-emitting assembly is configured to emit a laser beam. The converging lens group is configured to converge the laser beam emitted by the light-emitting assembly. The phosphor wheel includes a fluorescence-exciting region and a laser-reflecting region. The fluorescence-exciting region is configured to generate a fluorescence beam with a color different from the converged laser beam under an excitation of the laser beam. The fluorescent beam is incident on a combining component after passing through the converging lens group. The laser-reflecting region is configured to reflect the converged laser beam to the converging lens group. The laser beam is incident to the combining component after passing through the converging lens group. The combining component is disposed between the light-emitting assembly and the converging lens group. The combining component is configured to reflect the fluorescence beam excited by the phosphor wheel and the laser beam reflected by the phosphor wheel to a beam outlet of the laser source.

In another aspect, a laser projection apparatus is provided. The laser projection apparatus includes the laser source, an optical engine and a projection lens. The laser source is configured to emit illumination beams. The optical engine is configured to modulate the illumination beams emitted by the laser source, so as to obtain projection beams. The projection lens is configured to image the projection beams.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual size of products, actual processes of methods and actual timings of signals to which the embodiments of the present disclosure relate.

DETAILED DESCRIPTION

Figure 1:
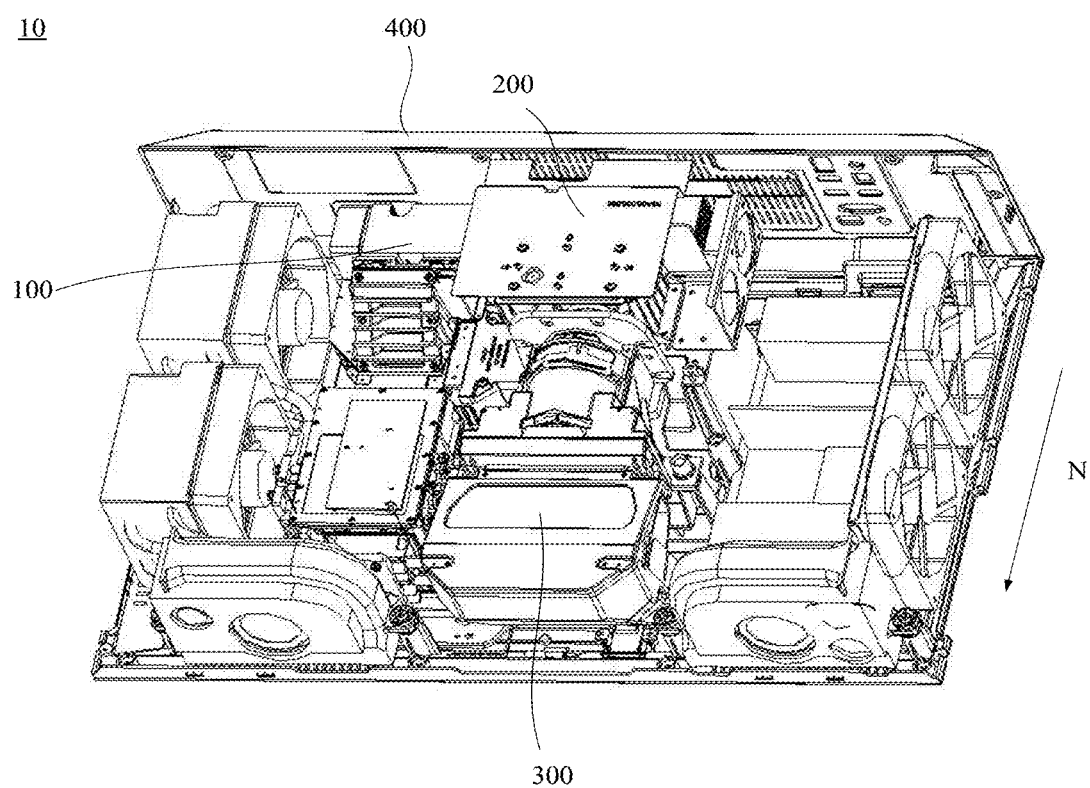
FIG. 1 is a diagram showing a structure of a laser projection apparatus, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the specification and the claims, the term "comprise" and other forms thereof such as the third-person singular form "comprises" and the present participle form "comprising" are construed as being open and inclusive, meaning "including, but not limited to". In the description, the terms such as "one embodiment", "some embodiments", "exemplary embodiments", "example", "specific example" or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, the terms "first" and "second" are only used for descriptive purposes, and cannot be construed as indicating or implying the relative importance or implicitly indicating the number of indicated technical features. Thus, features defined with "first" and "second" may explicitly or implicitly include one or more of the features. In the description of the embodiments of the present disclosure, the term "a plurality of" means two or more unless otherwise specified.

In the description of some embodiments, the term "connected" and its derivatives may be used. For example, the term "connected" may be used in the description of some embodiments to indicate that two or more components are in direct physical contact or electrical contact with each other. However, the term "connected" may also mean that two or more components are not in direct contact with each other, but still cooperate or interact with each other. The embodiments disclosed herein are not necessarily limited to the contents herein.

The phrase "A and/or B" includes the following three combinations: only A, only B, and a combination of A and B.

The use of the phrase "applicable to" or "configured to" herein means an open and inclusive language, which does not exclude devices that are applicable to or configured to perform additional tasks or steps.

The term such as "about", "substantially" or "approximately" as used herein includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

The term such as "parallel", "perpendicular" or "equal" as used herein includes a stated condition and a condition similar to the stated condition. A range of the similar condition is within an acceptable deviation range, and the acceptable deviation range is determined by a person of ordinary skill in the art, considering measurement in question and errors associated with measurement of a particular quantity (i.e., limitations of a measurement system). For example, the term "parallel" includes absolute parallelism and approximate parallelism, and an acceptable deviation range of the approximate parallelism may be, for example, a deviation within 5°. The term "perpendicular" includes absolute perpendicularity and approximate perpendicularity, and an acceptable deviation range of the approximate perpendicularity may also be, for example, a deviation within 5°. The term "equal" includes absolute equality and approximate equality, and an acceptable deviation range of the approximate equality may be that, for example, a difference between the two that are equal is less than or equal to 5% of either of the two.

Some embodiments of the present disclosure provide a laser projection apparatus. As shown in FIG. 1, the laser projection apparatus 10 includes a housing 400 (only a portion of the housing 400 being shown in FIG. 1), and a laser source 100, an optical engine 200, and a projection lens 300 that are assembled in the housing 400. The laser source 100 is configured to provide illumination beams (laser beams). The optical engine 200 is configured to modulate the illumination beams provided by the laser source 100 with image signals, so as to obtain projection beams. The projection lens 300 is configured to project the projection beams on a screen or a wall for imaging.

Figure 2:
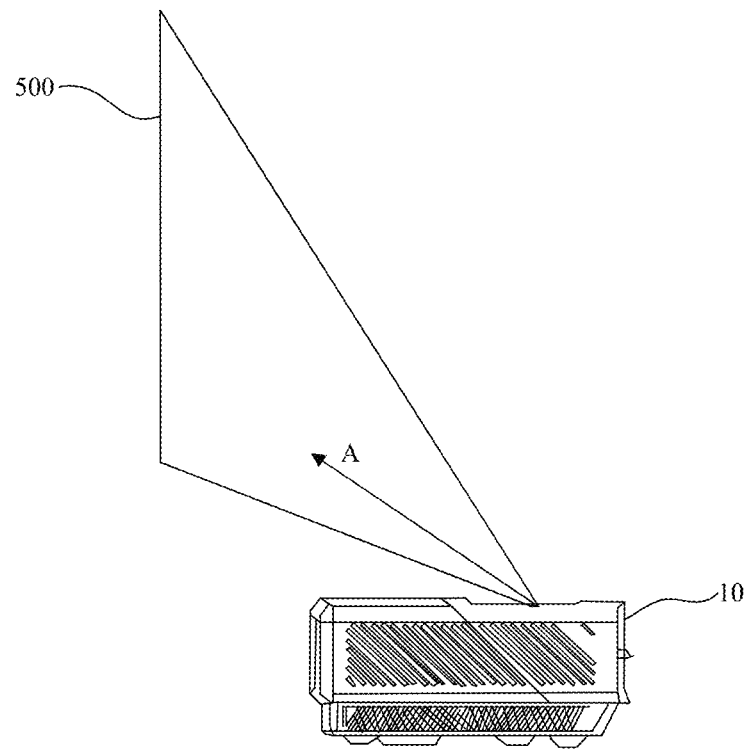
FIG. 2 is a diagram showing a structure of another laser projection apparatus, in accordance with some embodiments.

In some embodiments, as shown in FIG. 2, the laser projection apparatus 10 further includes a screen 500. The screen 500 is disposed in a laser-exit path of the projection lens 300, and the projection beams emitted by the projection lens 300 form an image on the screen 500.

The laser source 100, the optical engine 200, and the projection lens 300 are sequentially connected in a propagation direction of beams, and are each wrapped by a corresponding housing. The housings of the laser source 100, the optical engine 200 and the projection lens 300 support their corresponding optical components respectively and make the optical components meet certain sealing or airtight requirements. For example, the laser source 100 is hermetically sealed through its corresponding housing, which may well solve a light attenuation problem of the laser source 100.

Figure 3:
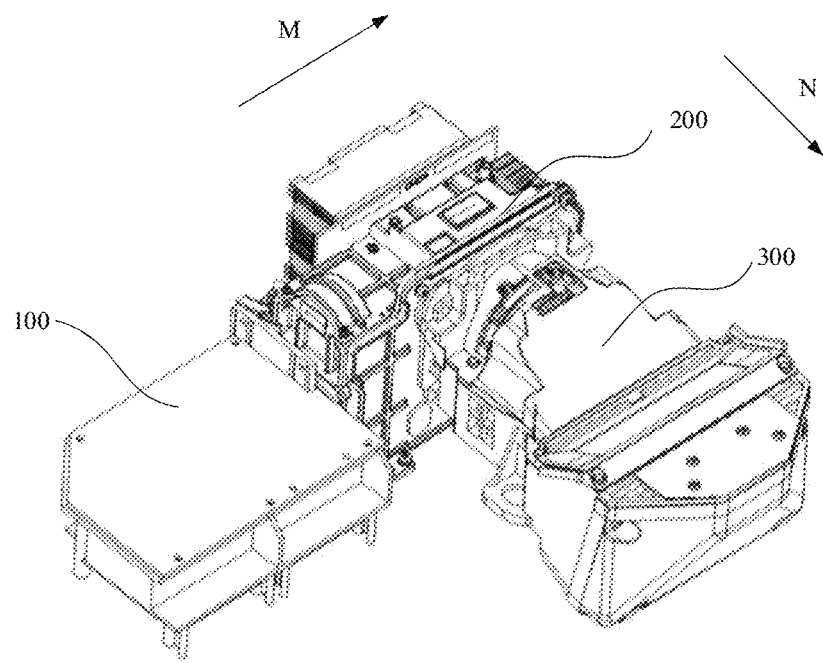
FIG. 3 is a diagram showing a structure of a laser source, an optical engine, and a projection lens in a laser projection apparatus, in accordance with some embodiments.

An end of the optical engine 200 is connected to the projection lens 300, and the optical engine 200 and the projection lens 300 are arranged in an exit direction of the projection beams of the laser projection apparatus 10 (referring to the N direction shown in FIG. 3). Another end of the optical engine 200 is connected to the laser source 100. In an example, as shown in FIG. 3, the laser source 100, the optical engine 200, and the projection lens 300 are connected in an "L" shape. That is, the exit direction of the projection beams of the laser projection apparatus 10 (referring to the N direction shown in FIG. 3) is substantially perpendicular to an exit direction of the illumination beams of the laser projection apparatus 10 (referring to the M direction shown in FIG. 3). On one hand, such a connection structure may adapt to characteristics of a beam path of a reflective light valve in the optical engine 200, and on another hand, it is also conducive to shortening a length of a beam path in a one-dimensional direction, which is helpful for structural arrangement of the laser projection apparatus 10. For example, in a case where the laser source 100, the optical engine 200, and the projection lens 300 are disposed in the one-dimensional direction (e.g., the direction M perpendicular to the direction N), a length of a beam path in the one-dimensional direction is long, which is not conducive to the structural arrangement of the laser projection apparatus 10. The reflective light valve will be described below.

In some embodiments, the laser source 100 may provide beams of three primary colors sequentially (beams of other colors may also be added on a basis of the beams of three primary colors). Due to a phenomenon of visual persistence of human eyes, what the human eyes see is white beams formed by mixing the beams of three primary colors. Alternatively, the laser source 100 simultaneously outputs the beams of three primary colors, so as to continuously emit the white beams. The laser source 100 includes a laser device. The laser device emits laser beams of at least one color, such as blue laser beams.

Figure 4:
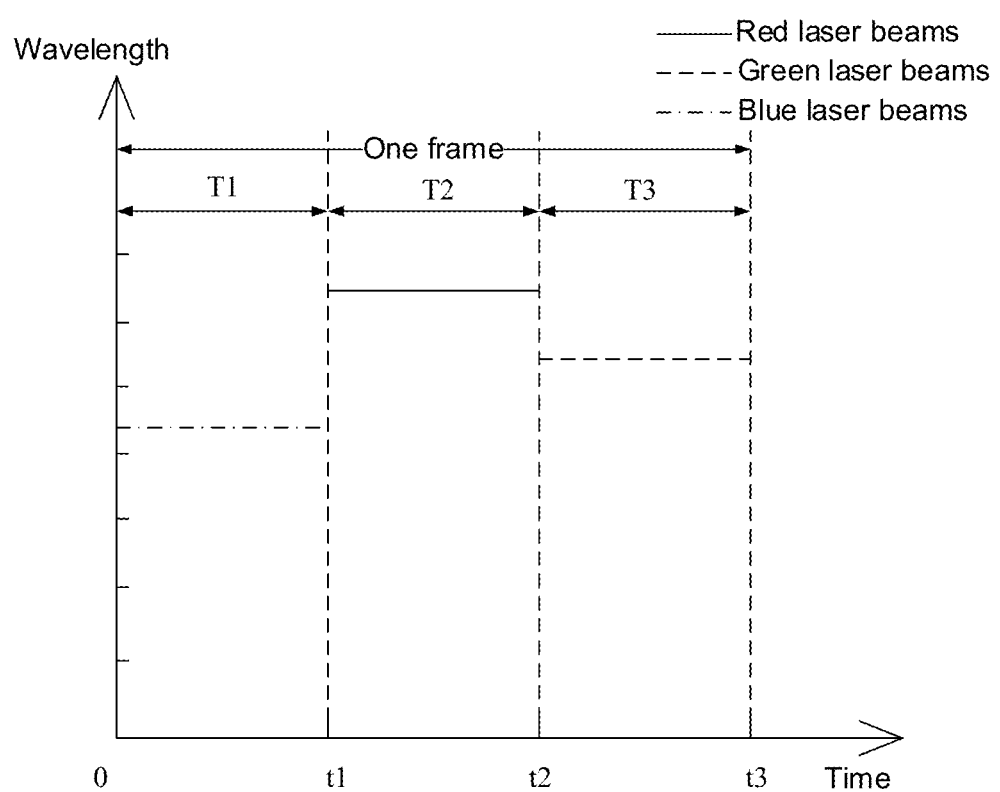
FIG. 4 is a timing diagram of a laser source in a laser projection apparatus, in accordance with some embodiments.

For example, as shown in FIG. 4, during a projection process of a frame of target image, the laser source 100 sequentially outputs blue laser beams, red laser beams and green laser beams. The laser source 100 outputs the blue laser beams in a time period T1, the red laser beams in a time period T2, and the green laser beams in a time period T3. A time for the laser source 100 to accomplish the sequential output of each primary color beam once is a cycle for the laser source 100 to output the primary color beams. In a display cycle of the frame of target image, the laser source 100 performs the sequential output of each primary color beam once. Therefore, the display cycle of the frame of target image is equal to the cycle for the laser source 100 to output the primary color beams, and they both equal to a sum of T1, T2 and T3. According to a trichromatic mixing principle, human eyes are unable to distinguish the colors of the beams at a certain moment, and what are perceived by the human eyes are still mixed white beams.

Figure 5:
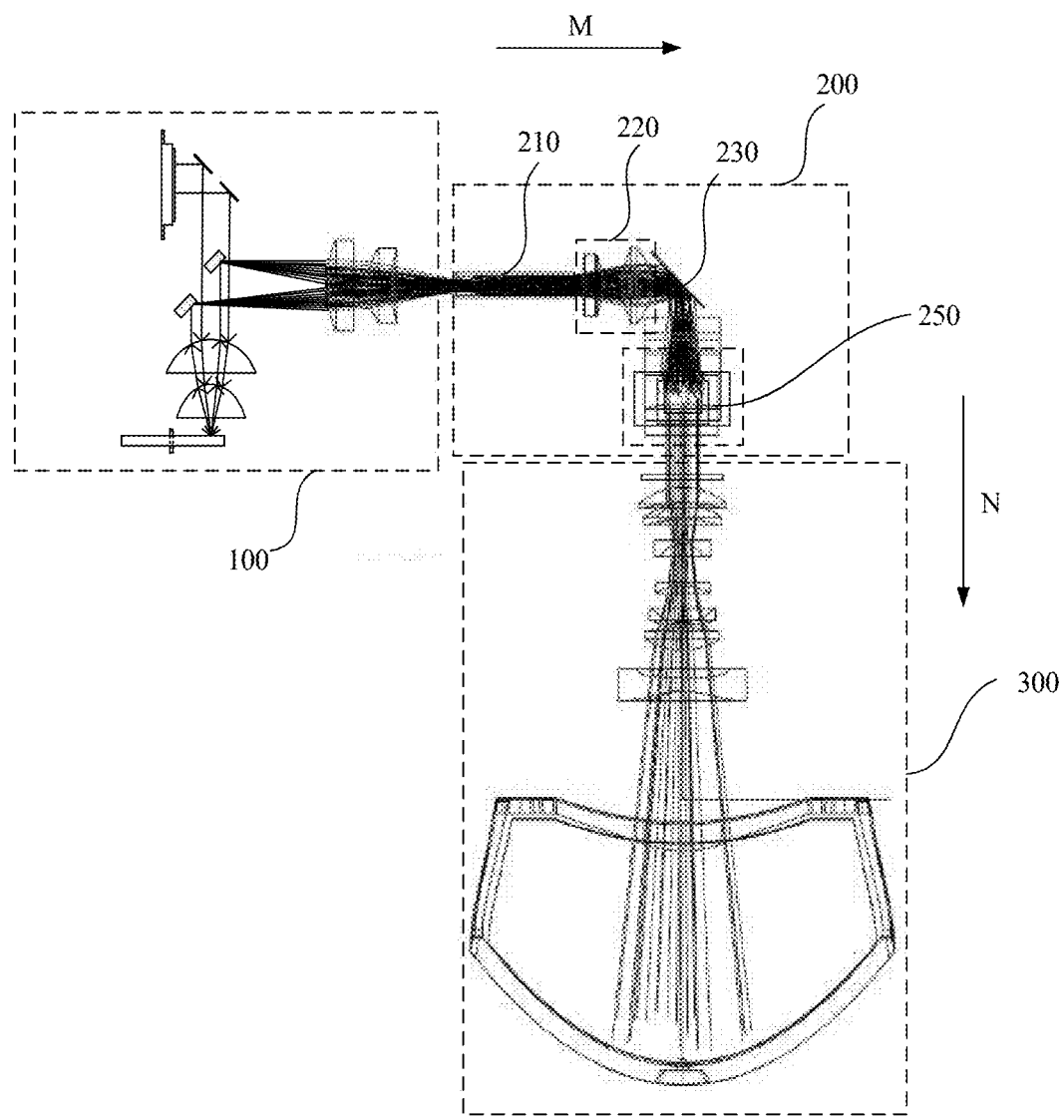
FIG. 5 is a diagram showing a beam path of a laser source, an optical engine, and a projection lens in a laser projection apparatus, in accordance with some embodiments.
Figure 6:
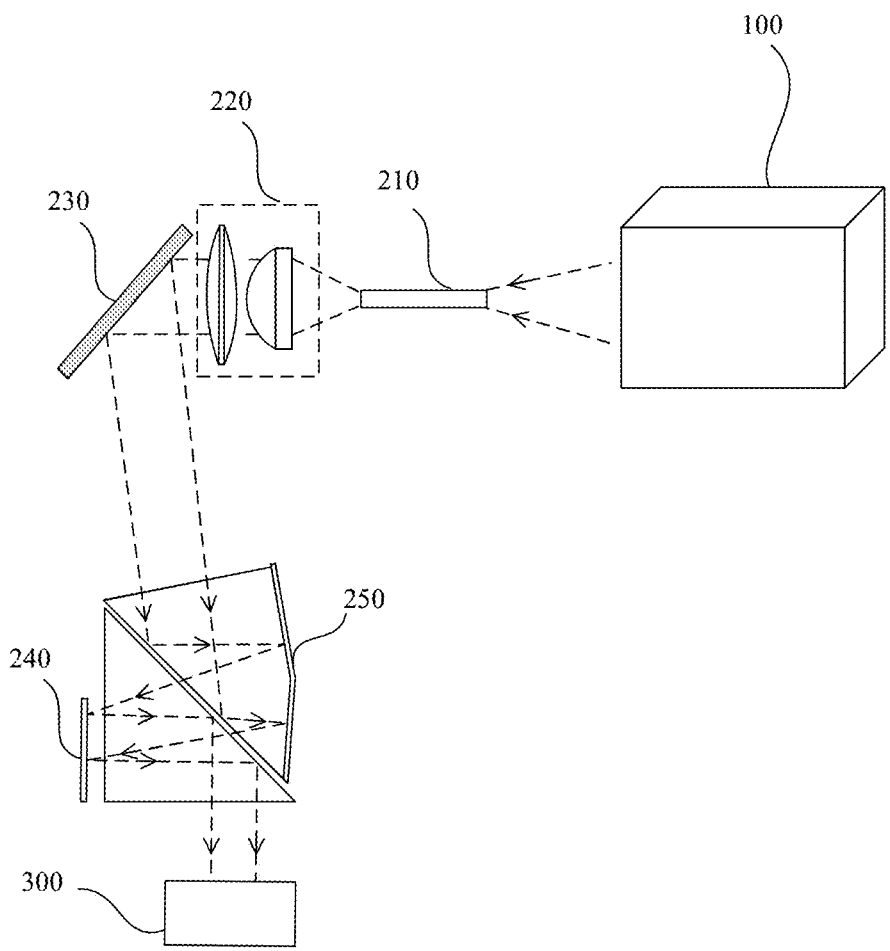
FIG. 6 is a diagram showing another beam path of a laser source, an optical engine, and a projection lens in a laser projection apparatus, in accordance with some embodiments.

The illumination beams emitted by the laser source 100 enter the optical engine 200. Referring to FIGS. 5 and 6, the optical engine 200 includes a light pipe 210, a lens assembly 220, a reflector 230, a digital micromirror device (DMD) 240 and a prism assembly 250. The light pipe 210 may receive the illumination beams provided by the laser source 100 and homogenize the illumination beams. In addition, an outlet of the light pipe 210 may be rectangular, so as to have a shaping effect on a beam spot. The lens assembly 220 may first magnify the illumination beams, and then converge the collimated illumination beams and emit the converged illumination beams to the reflector 230. The reflector 230 may reflect the illumination beams to the prism assembly 250. The prism assembly 250 reflects the illumination beams to the digital micromirror device 240. The digital micromirror device 240 modulates the illumination beams, so as to obtain the projection beams, and reflects the projection beams into the projection lens 300.

In the optical engine 200, the DMD 240 is a core component, which plays a role of modulating the illumination beams provided by the laser source 100 through the image signals. That is, the DMD 240 controls the projection beams to display different colors and luminance according to different pixels of an image to be displayed, so as to finally form an optical image. Therefore, the DMD 240 is also referred to as an optical modulator or a light valve. Depending on whether the optical modulator (or the light valve) transmits or reflects the illumination beams, the optical modulator (or the light valve) may be classified as a transmissive optical modulator (or light valve) or a reflective optical modulator (or light valve). For example, the DMD 240 shown in FIG. 6 reflects the illumination beams, and thus it is the reflective optical modulator. A liquid crystal light valve transmits the illumination beams, and thus it is the transmissive optical modulator. In addition, according to a number of the optical modulators (or the light valves) used in the optical engine 200, the optical engine 200 may be classified as a single-chip system, a double-chip system, or a three-chip system. For example, only one DMD 240 is used in the optical engine 200 shown in FIG. 6, and thus the optical engine 200 may be referred to as the single-chip system. In a case where three digital micromirror devices 240 are used, the optical engine 200 may be referred to as the three-chip system.

In a case where the optical engine 200 is the three-chip system, the laser source 100 simultaneously outputs the beams of three primary colors, so as to continuously emit the white beams.

It will be noted that, according to a projection architecture, the optical modulators (or the light valves) may include many kinds, such as a liquid crystal on silicon (LCOS) projection architecture, a liquid crystal display (LCD) projection architecture or a digital micromirror device (DMD) projection architecture. Since the optical engine 200 shown in FIG. 6 applies a digital light processing (DLP) projection architecture in some embodiments of the present disclosure, the optical modulators (or the light valves) in some embodiments of the present disclosure are digital micromirror devices (DMD) 240.

Figure 7:
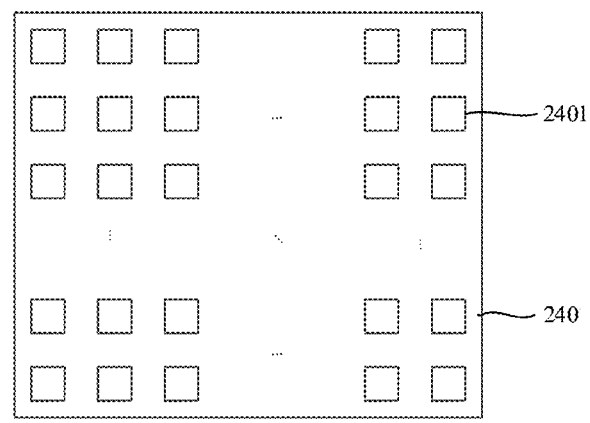
FIG. 7 is a diagram showing an arrangement of micromirrors in a digital micromirror device, in accordance with some embodiments.
Figure 8:
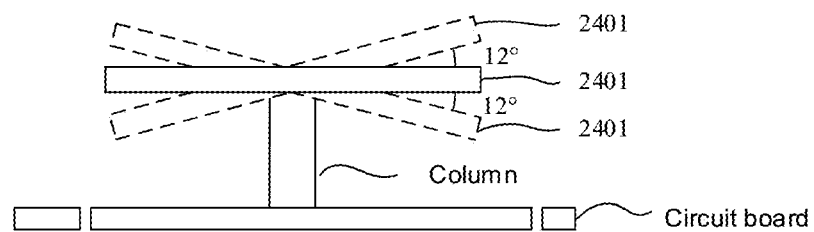
FIG. 8 is a diagram showing a swing position of a micromirror in the digital micromirror device shown in FIG. 7.

As shown in FIG. 7, the digital micromirror device 240 includes thousands of micromirrors 2401 that may be individually driven to rotate. These micromirrors 2401 are arranged in an array, and each micromirror 2401 corresponds to one pixel in the image to be displayed. As shown in FIG. 8, in the DLP projection architecture, each micromirror 2401 is equivalent to a digital switch. The micromirror may swing within a range of plus or minus 12 degrees (i.e., ±12°) or a range of plus or minus 17 degrees (i.e., ±17°) under an action of an external force.

Figure 9:
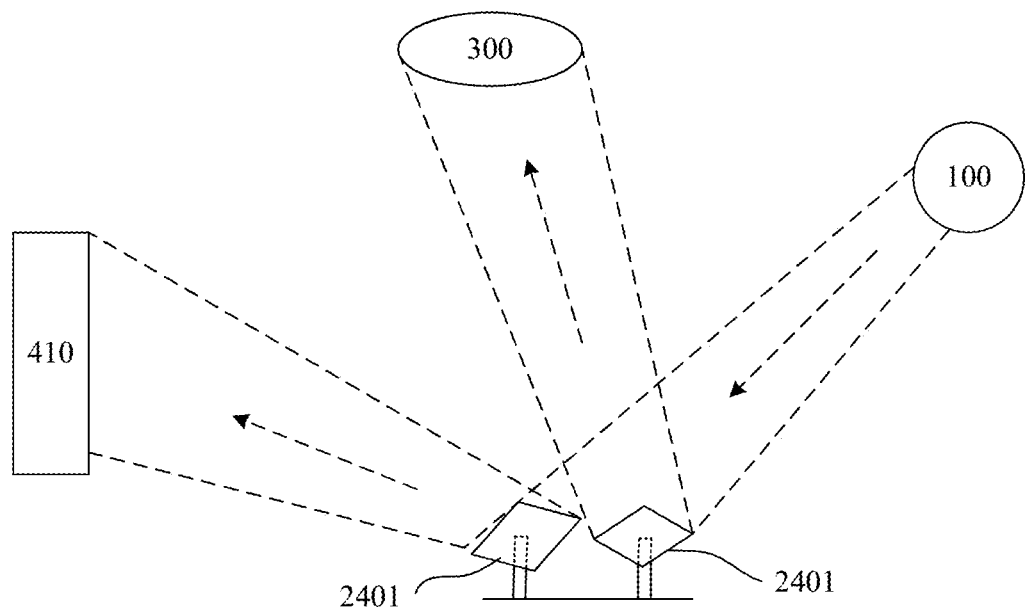
FIG. 9 is a schematic diagram showing operation of micromirrors, in accordance with some embodiments.

As shown in FIG. 9, a laser beam reflected by the micromirror 2401 at a negative deflection angle is referred to as an OFF laser beam, and the OFF laser beam is an ineffective laser beam, and which usually irradiates on the housing 400 of the laser projection apparatus 10 and the housing of the optical engine 200, or is absorbed by a laser absorption unit 410. A laser beam reflected by the micromirror 2401 at a positive deflection angle is referred to as an ON laser beam. The ON laser beam is an effective beam reflected by the micromirror 2401 on a surface of the DMD 240 when it receives irradiation of the illumination beams, and the ON laser beam enters the projection lens 300 at a positive deflection angle for projection imaging. An ON state of the micromirror 2401 is a state that the micromirror 2401 is in and may be maintained when the illumination beams emitted by the laser source 100 may enter the projection lens 300 after being reflected by the micromirror 2401. That is, the micromirror 2401 is in a state of the positive deflection angle. An OFF state of the micromirror 2401 is a state that the micromirror 2401 is in and may be maintained when the illumination beams emitted by the laser source 100 does not enter the projection lens 300 after being reflected by the micromirror 2401. That is, the micromirror 2401 is in a state of the negative deflection angle.

For example, for a micromirror 2401 with a deflection angle of ±12°, a state at +12° is the ON state, and a state at −12° is the OFF state. For a deflection angle between −12° and +12°, it is not used in practice, and actual operation states of the micromirror 2401 are only the ON state and the OFF state. For a micromirror 2401 with a deflection angle of ±17°, a state at +17° is the ON state, and a state at −17° is the OFF state. The image signals are converted into digital codes such as 0 and 1 after being processed, and these digital codes may drive the micromirrors 2401 to swing.

In a display cycle of a frame of an image, some or all of the micromirrors 2401 are switched once between the ON state and the OFF state, so that gray scales of pixels in the frame image are achieved according to durations of the micromirrors 2401 in the ON state and the OFF state. For example, in a case where the pixels have 256 gray scales from 0 to 255, micromirrors 2401 corresponding to a gray scale 0 are each in the OFF state in an entire display cycle of the frame of the image, micromirrors 2401 corresponding to a gray scale 255 are each in the ON state in the entire display cycle of the frame of the image, and micromirrors 2401 corresponding to a gray scale 127 are each in the ON state for a half of time and in the OFF state for another half of time in the display cycle of the frame of the image. Therefore, by controlling a state that each micromirror 2401 in the DMD 240 is in and a duration of each state in the display cycle of the frame of the image through the image signals, luminance (the gray scale) of a pixel corresponding to the micromirror 2401 may be controlled, thereby modulating the illumination beams projected onto the DMD 240.

Referring to FIGS. 5 and 6, the light pipe 210, the lens assembly 220 and the reflector 230 at a front end of the DMD 240 form an illumination path, and the illumination beams emitted by the laser source 100 pass through the illumination path to have a size and an incident angle which are met the requirements of the DMD 240.

As shown in FIG. 5, the projection lens 300 includes a combination of a plurality of lenses, which are usually divided by groups, and are divided into a three-segment combination including a front group, a middle group and a rear group, or a two-segment combination including a front group and a rear group. The front group is a lens group proximate to a laser-exit side of the laser projection apparatus 10 (i.e., a side of the projection lens 300 away from the optical engine 200 along the N direction in FIG. 5), and the rear group is a lens group proximate to a laser-exit side of the optical engine 200 (i.e., a side of the projection lens 300 proximate to the optical engine 200 along the N direction in FIG. 5). The projection lens 300 may be a zoom projection lens, or a prime adjustable-focus projection lens, or a prime projection lens.

In some embodiments, the laser projection apparatus 10 is an ultra-short-focus laser projection apparatus, and the projection lens 300 is an ultra-short-focus projection lens. For example, as shown in FIG. 2, the laser beams modulated by the light valve exit in an obliquely upward direction (referring to the direction A shown in FIG. 2) after entering the projection lens 300. In this case, compared with a laser-exit manner in which optical axes of the projection beams are located in a perpendicular bisector of a projection image in a long-focus laser projection apparatus, the ultra-short-focus projection lens usually has an offset within a range of 120% to 150% with respect to the projection image. This projection manner has a small projection ratio (i.e., a ratio of a distance between the laser projection apparatus 10 and the projected screen 50 to a dimension of a diagonal of the projection image). For example, the projection ratio is about 0.2 or less. The distance between the laser projection apparatus 10 and the screen 50 is small, so that it is possible to achieve a large-sized projection display with a small projection ratio.

For ease of description, some embodiments of the present disclosure are mainly described by taking an example in which the laser source 100 sequentially outputs the beams of three primary colors, the laser projection apparatus 10 adopts the DLP projection architecture, the optical modulator in the optical engine 200 is the digital micromirror device 240, and the projection lens 300 is the ultra-short-focus projection lens, however, this should not be construed as a limitation of the present disclosure.

Figure 10:
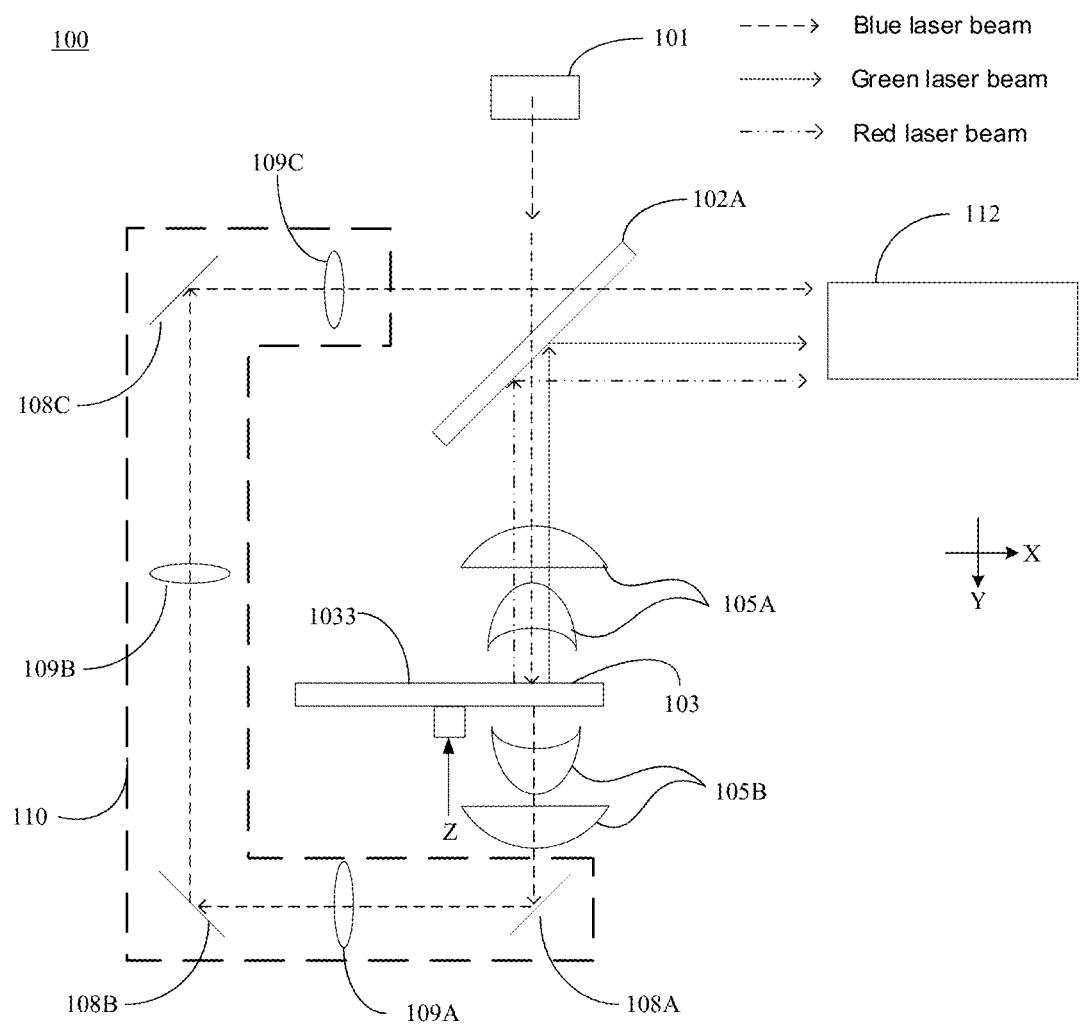
FIG. 10 is a diagram showing a beam path of a laser source, in accordance with some embodiments.

In some examples, a laser source 100 is provided. As shown in FIG. 10, the laser source 100 includes a light-emitting assembly 101, a combining lens 102A, a first converging lens group 105A, a second converging lens group 105B, a phosphor wheel 103, a relay loop 110 and a light collection member 112.

The light-emitting assembly 101 is configured to output the blue laser beams to a laser receiving surface 1033 of the phosphor wheel 103.

The phosphor wheel 103 includes a fluorescence-exciting region and a laser-transmitting region. The fluorescence-exciting region of the phosphor wheel 103 is configured to generate fluorescence beams (e.g., green fluorescence beams and red fluorescence beams) under an excitation by the blue laser beams output by the light-emitting assembly 101. The fluorescent beams are incident on the combining lens 102A in a direction opposite to the blue laser beams. The laser-transmitting region of the phosphor wheel 103 is configured to transmit blue laser beams emitted by the light-emitting assembly 101, so that the transmitted blue laser beams is incident to the relay loop 110.

The combining lens 102A is disposed between the light-emitting assembly 101 and the phosphor wheel 103, and is located on a beam path of the blue laser beams emitted by the light-emitting assembly 101. The combining lens 102A is a dichroic lens, and is configured to transmit the blue laser beams emitted by the light-emitting assembly 101 and the blue laser beams passing through the relay loop 110, and reflect the green fluorescence beams and the red fluorescence beams reflected by the fluorescence-exciting region of the phosphor wheel 103 to the light collection member 112.

The first converging lens group 105A is disposed on a side of the phosphor wheel 103 close to the combining lens 102A, and is located on the beam path of the blue laser beam emitted by light-emitting assembly 101. The second converging lens group 105B is disposed on a side of the phosphor wheel 103 away from the combining lens 102A, and is located on a beam path of blue laser beams passing through the laser-transmitting region of the phosphor wheel 103. Both the first converging lens group 105A and the second converging lens group 105B are configured to converge the laser beam.

The relay loop 110 is configured to change the beam path of the blue laser beams passing through the laser-transmitting region of the phosphor wheel 103. The relay loop 110 includes a turning mirror 108A, a turning mirror 108B, a turning mirror 108C, a first lens 109A, a second lens 109B, and a third lens 109C.

In some embodiments, as shown in FIG. 10, the phosphor wheel 103 may rotate around a rotating shaft Z. As the phosphor wheel 103 rotates, the fluorescence-exciting region and the laser-transmitting region are alternately irradiated by the blue laser beams emitted by the light-emitting assembly 101.

In a case where the blue laser beams emitted by the light-emitting assembly 101 are incident on the laser-transmitting region of the phosphor wheel 103, the blue laser beams may pass through the laser-transmitting region, be converged by the second converging lens group 105B and then be incident on the turning mirror 108A, and in turn be reflected by the turning mirror 108A to pass through the first lens 109A and be incident on the turning mirror 108B. Then, the blue laser means may be reflected by the turning mirror 108B to pass through the second lens 109B and be incident on the turning mirror 108C, and be reflected by the turning mirror 108C to pass through the third lens 109C and be incident on the combining lens 102A. Finally, the blue laser beams pass through the combining lens 102A and are incident on the light collection member 112.

In a case where the blue laser beams emitted by the light-emitting assembly 101 are incident on the fluorescence-exciting region of the phosphor wheel 103, the blue laser beams may excite the fluorescent material in the fluorescence-exciting region to generate fluorescent beams such as red fluorescent beams and green fluorescent beams, which are reflected by the phosphor wheel 103 to the combining lens 102A. The combining lens 102A may reflect the red fluorescent beams and the green fluorescent beams to the light collection member 112.

It will be understood that by providing the relay loop 110 in the laser source 100, the beam path of the blue laser beams may be changed, so that the beams of the three primary colors may be output sequentially. However, the relay loop 110 will significantly increase the number of lenses in the laser source 100, which will reduce stability and occupy space of the laser source 100, thereby increasing a volume of the laser source 100.

The laser source 100 according to some embodiments of the present disclosure will be described in detail below.

Figure 11A:
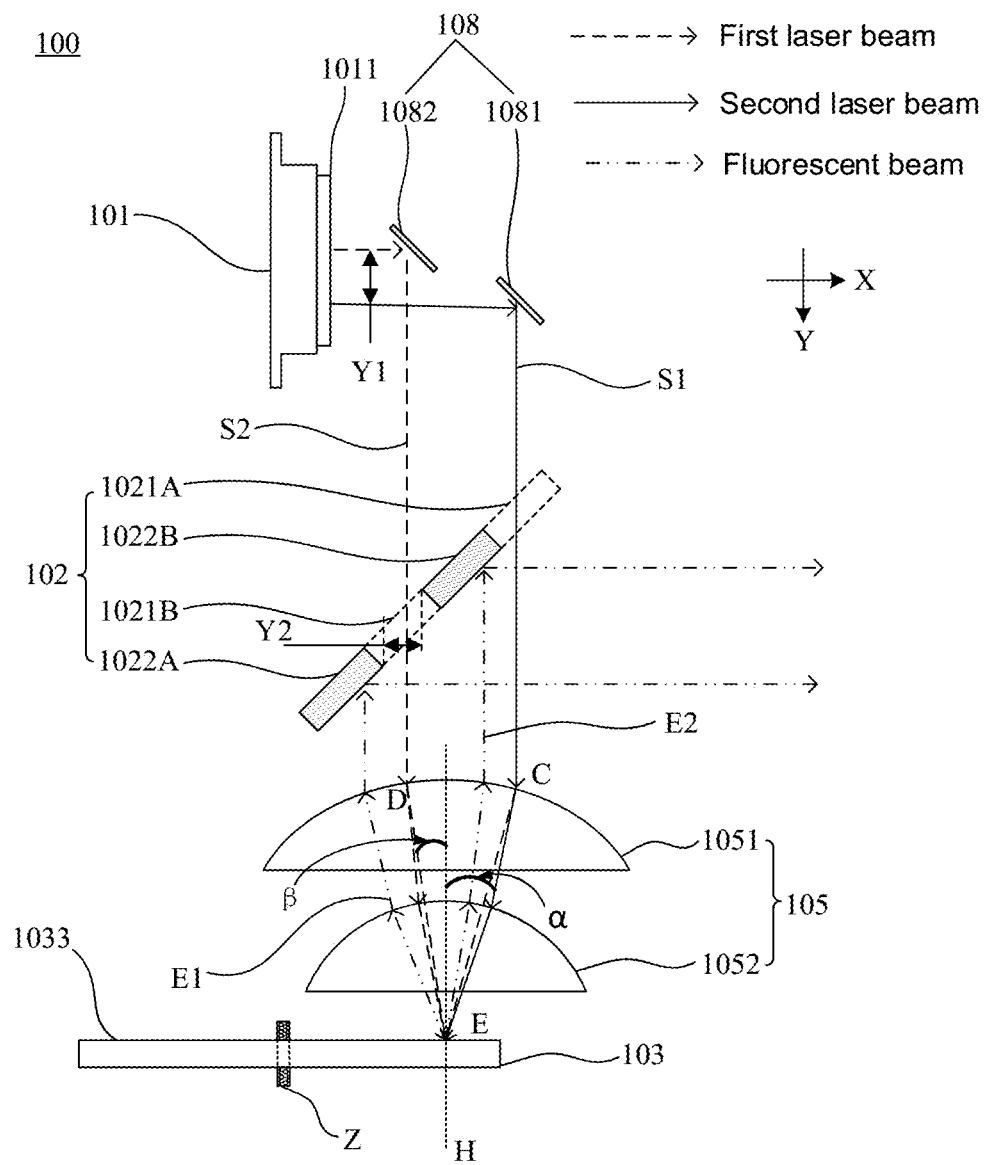
FIG. 11A is a diagram showing a beam path of another laser source, in accordance with some embodiments.
Figure 11B:
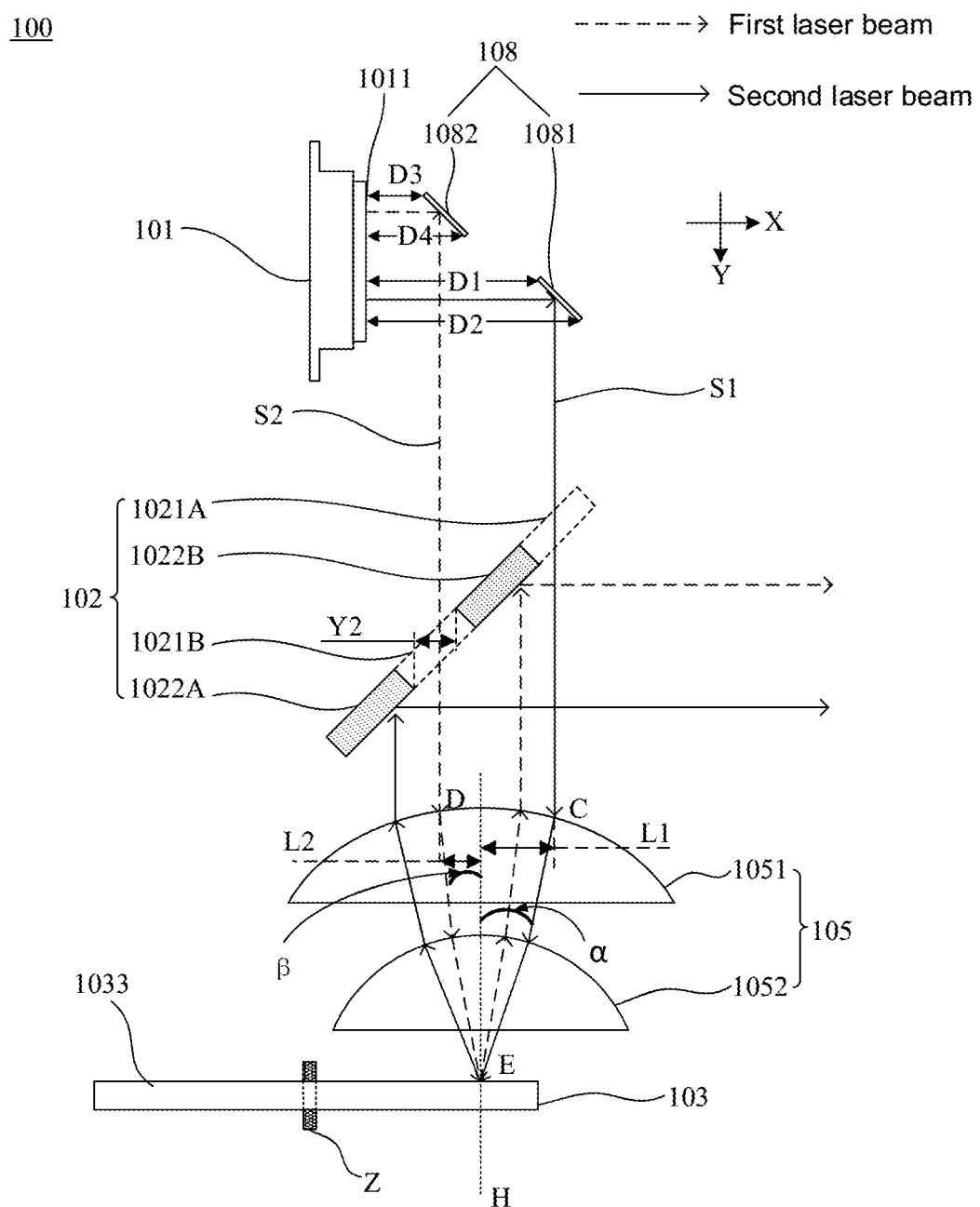
FIG. 11B is a diagram showing a beam path of yet another laser source, in accordance with some embodiments.

In some embodiments, as shown in FIGS. 11A and 11B, the laser source 100 includes at least one light-emitting assembly 101, a combining component 102, a phosphor wheel 103, a converging lens group 105 and a turning component 108. The at least one light-emitting assembly 101 is configured to emit a first laser beam S1 and a second laser beam S2.

A number of the at least one light-emitting assembly 101 is not limited in the present disclosure, and it may be one, two or more. For example, the number of the at least one light-emitting assembly 101 is one, and on this basis, the first laser beam S1 and the second laser beam S2 are two parts of a laser beam. For another example, the number of the at least one light-emitting assembly 101 is two, and on this basis, the first laser beam S1 and the second laser beam S2 are two independent laser beams and emitted by two light-emitting assemblies 101 respectively. In a case where the number of the at least one light-emitting assembly 101 is three or more, these light-emitting assemblies 101 may emit three, four or more laser beams; and the first laser beam S1 and the second laser beam S2 are any two of these laser beams.

Figure 17A:
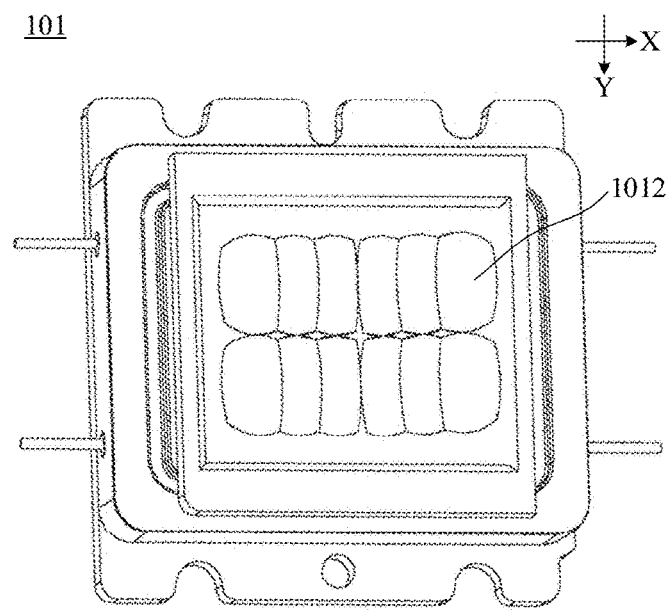
FIG. 17A is a diagram showing a structure of a light-emitting assembly, in accordance with some embodiments.
Figure 17B:
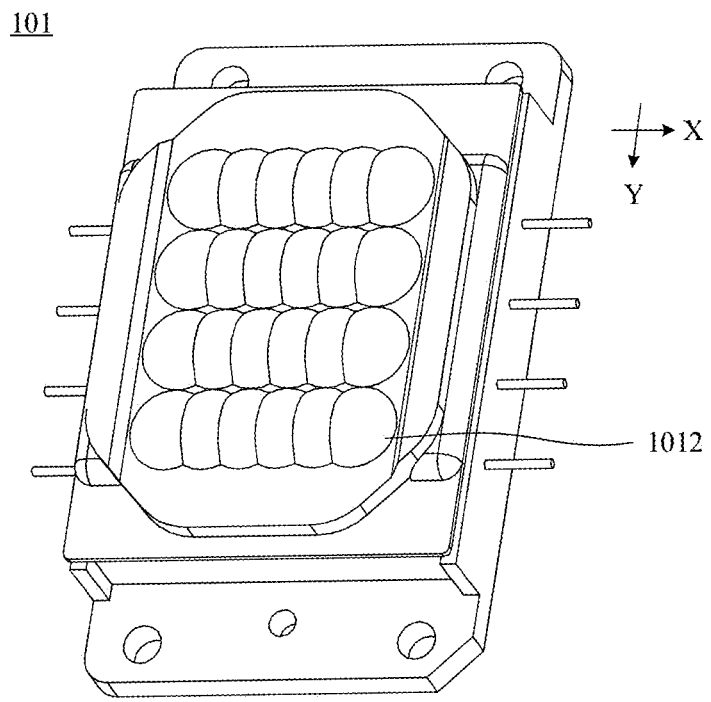
FIG. 17B is a diagram showing a structure of another light-emitting assembly, in accordance with some embodiments.

In some embodiments, as shown in FIGS. 17A and 17B, the light-emitting assembly 101 may be a multi-chip laser diode (MCL) device. The MCL device may include a plurality of light-emitting chips 1012 arranged in an array and packaged in a same case. Each light-emitting chip 1012 may emit a laser beam independently. The first laser beam S1 and the second laser beam S2 are respectively emitted from different light-emitting regions of the laser device. For example, the first laser beam S1 and the second laser beam S2 may be respectively emitted by different light-emitting chips 1012 in the laser device.

In some embodiments, colors of the first laser beam S1 and the second laser beam S2 are the same. For example, both the first laser beam S1 and the second laser beam S2 are blue. On this basis, the first laser beam S1 and the second laser beam S2 are emitted by the laser device at the same time and excite the fluorescence-exciting region to generate fluorescence beams. In a case where the plurality of light-emitting chips 1012 of the laser device emit laser beams simultaneously, the laser beams emitted by the laser device are thick, and luminance of the laser beams is high; moreover, luminance of the laser beams after passing through each optical element in the laser source 100 is also high. Therefore, luminance of the image obtained when the laser projection apparatus 10 performs a projection is high, which improves the projection effect of the laser projection apparatus 10.

In some other embodiments, the colors of the first laser beam S1 and the second laser beam S2 are different. For example, the first laser beam S1 is blue and the second laser beam S2 is red. On this basis, the first laser beam S1 and the second laser beam S2 are emitted by the laser device sequentially. The first laser beam S1 is used as an exciting laser source and a blue primary color laser source, and the second laser beam S2 is used as a red primary color laser source. In a case where the plurality of light-emitting chips 1012 of the laser device emit the laser beams at different times, since only some of the light-emitting chips 1012 in the laser device emit the laser beams simultaneously, the emitted laser beams are thin, and beams after passing through each optical element in the laser source 100 are also thin. In addition, since there is no need for the light-emitting chips 1012 in the laser device to emit laser beams continuously, a pulse current may be used to supply power to the light-emitting chips 1012, and energy of the pulse current is high, so that the light-emitting chips 1012 may emit laser beams with high luminance. Moreover, there is no need for the light-emitting chips 1012 to emit laser beams continuously, which improves a service life of the light-emitting chips 1012 in the laser device.

In some embodiments, a wavelength range of the first laser beam S1 emitted by the light-emitting assembly 101 overlaps or partially overlaps with a wavelength range of the second laser beam S2 emitted by the light-emitting assembly 101. For example, colors of the laser beams emitted by the light-emitting assembly 101 are all blue. The wavelength ranges of the first laser beam S1 and the second laser beam S2 are both within a range of 400 nm to 450 nm inclusive. Alternatively, the wavelength range of the first laser beam S1 is within a range of 400 nm to 430 nm inclusive, and the wavelength range of the second laser beam S2 is within a range of 420 nm to 450 nm inclusive. Colors of fluorescent beams emitted by the phosphor wheel 103 under an excitation of the blue laser beams may include at least one of red, green or yellow. However, the colors of the laser beams emitted by the light-emitting assembly 101 and the fluorescent beams excited by the phosphor wheel 103 may also be other colors. This disclosure does not limit thereto.

In some embodiments, dominant wavelengths of the first laser beam S1 and the second laser beam S2 are different. For example, the first laser beam S1 and the second laser beam S2 both are blue laser beams with different dominant wavelengths.

It will be noted that, a beam of light is obtained by compounding light of multiple wavelengths in one wavelength range, the beam of light perceived by the human eyes is a result of the combined action of light of each wavelength. As a result, the human eyes perceives the beam of light which is corresponding to a light of a single wavelength, and the wavelength is the dominant wavelength of the beam of light.

By providing two laser beams (e.g., the first laser beam S1 and the second laser beam S2), it is possible to make positions where the two laser beams irradiate on a same optical element (e.g., the combining component 102 and the converging lens group 105) in a beam path of the laser beams to be different, so that a problem of aging or performance degradation caused by localized exposure of the optical element to high-energy beams over a long period of time may be improved.

In some embodiments, as shown in FIG. 11A, both the first laser beam S1 and the second laser beam S2 are emitted by the light-emitting assembly 101, and the first laser beam S1 and the second laser beam S2 are two laser beams whose beam paths do not overlap. The first laser beam S1 and the second laser beam S2 are spaced apart by a first predetermined distance Y1. The first predetermined distance Y1 is greater than at least one of a width of the first laser beam S1 or a width of the second laser beam S2, so that the beam path of the first laser beam S1 do not overlap with the beam path of the second laser beam S2, and the first laser beam S1 and the second laser beam S2 are incident on different positions of a same optical element in the beam paths.

The following is mainly described by taking an example in which both the first laser beam S1 and the second laser beam S2 are simultaneously emitted by the one light-emitting assembly 101, and the first laser beam S1 and the second laser beam S2 are two laser beams whose beam paths do not overlap.

Figure 12A:
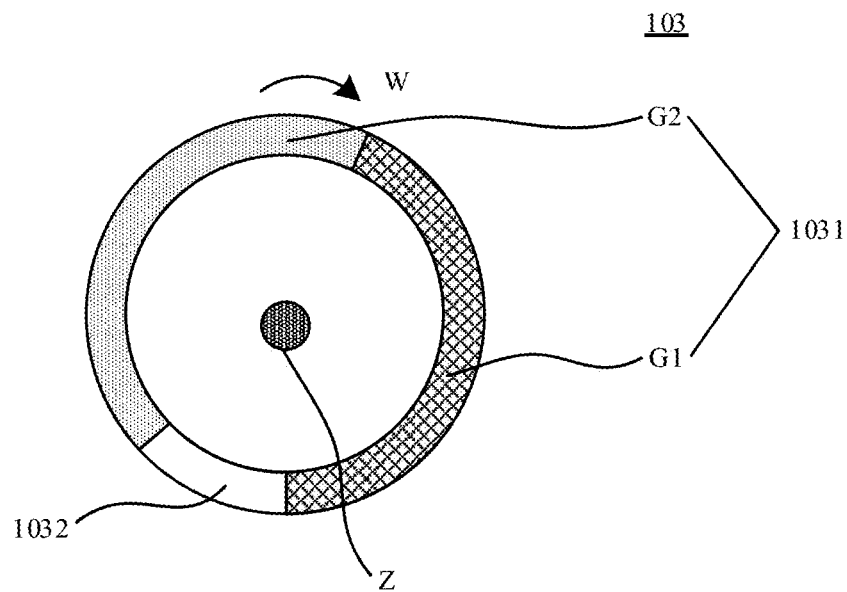
FIG. 12A is a diagram showing a structure of a phosphor wheel, in accordance with some embodiments.

As shown in FIG. 12A, the phosphor wheel 103 includes a fluorescence-exciting region 1031 and a laser-reflecting region 1032, and the phosphor wheel 103 does not include the laser-transmitting region. The fluorescence-exciting region 1031 of the phosphor wheel 103 is configured to emit fluorescent beams with colors different from colors of the laser beams under an excitation of the incident laser beams. The laser-reflecting region 1032 of the phosphor wheel 103 is configured to reflect the incident laser beams.

There is a difference between FIG. 11A and FIG. 11B. In FIG. 11A, the laser beams emitted by the light-emitting assembly 101 is incident on the fluorescence-exciting region 1031 of the phosphor wheel 103 after passing through optical elements, and excite the fluorescence-exciting region 1031 to emit fluorescence beams. In FIG. 11B, the laser beams emitted by the light-emitting assembly 101 is incident on the laser-reflecting region 1032 of the phosphor wheel 103 after passing through optical elements, and is reflected by the laser-reflecting region 1032.

In some embodiments, the fluorescence-exciting region 1031 and the laser-reflecting region 1032 are enclosed to form a closed-loop shape. For example, the fluorescence-exciting region 1031 and the laser-reflecting region 1032 may be enclosed in a ring shape. The laser beams will not irradiate on a rest of the phosphor wheel 103 except for the fluorescence-exciting region 1031 and the laser-reflecting 1032, and thus the rest of the phosphor wheel 103 may reflect or transmit the laser beams, which is not limited in the present disclosure. A rotating shaft Z of the phosphor wheel 103 may pass through a center of the phosphor wheel 103 and be perpendicular to a surface of the phosphor wheel 103.

In some embodiments, both the fluorescence-exciting region 1031 and the laser-reflecting region 1032 are fan-shaped, so as to enclose a disk shape. The rotating shaft Z of the phosphor wheel 103 may pass through a center of the disk and be perpendicular to a surface of the disk.

In some embodiments, the fluorescence-exciting region 1031 may emit fluorescent beams in various directions under the excitation of the laser beams, and a light-emitting angle of the fluorescence-exciting region 1031 may be within a range of 0° to 180° inclusive (e.g., 30°, 45°, 60°, 90°, 120°, 150° or 180°).

The fluorescence-exciting region 1031 may be provided with at least one of green fluorescent material, red fluorescent material or yellow fluorescent material. The fluorescent materials may be phosphor powder. The fluorescent material of each color may emit fluorescent beams of a corresponding color via the excitation of the laser beams. For example, the green fluorescent material may emit green fluorescent beams via the excitation of the laser beams, the red fluorescent material may emit red fluorescent beams via the excitation of the laser beams, and the yellow fluorescent material may emit yellow fluorescent beams via the excitation of the laser beams.

In some embodiments, the fluorescence-exciting region 1031 includes sub-fluorescence-exciting regions, and each sub-fluorescence-exciting region is provided with a fluorescent material of one color. In a case where the fluorescence-exciting region 1031 includes a plurality of sub-fluorescence-exciting regions, the plurality of sub-fluorescence-exciting regions and the laser-reflecting region 1032 may be arranged circumferentially around the rotating shaft Z.

For example, as shown in FIG. 12A, the fluorescence-exciting region 1031 includes two sub-fluorescence-exciting regions, that is, a first sub-fluorescence-exciting region G1 and a second sub-fluorescence-exciting region G2. The phosphor wheel 103 may rotate around the rotating shaft Z in a W direction or an opposite direction of the W direction.

In some embodiments, the two sub-fluorescence-exciting regions are provided with green fluorescent material and red fluorescent material respectively. Alternatively, the two sub-fluorescence-exciting regions are provided with green fluorescent material and yellow fluorescent material respectively. Alternatively, the two sub-fluorescence-exciting regions are provided with green fluorescent material and orange fluorescent material respectively.

In some embodiments, an area of each sub-fluorescence-exciting region (G1 or G2) is same, and the area of each sub-fluorescence-exciting region (G1 or G2) is not equal to an area of the laser-reflecting region 1032.

The laser beams incident on the laser-reflecting region 1032 of the phosphor wheel 103 are the blue laser beams, so that the laser-reflecting region 1032 may reflect the blue laser beams due to the irradiation of the blue laser beams. The first sub-fluorescence-exciting region G1 is provided with the red fluorescent material, so that the first sub-fluorescence-exciting region G1 may emit the red fluorescent beams due to the excitation of the blue laser beams. The second sub-fluorescence-exciting region G2 is provided with the green fluorescent material, so that the second sub-fluorescence-exciting region G2 may emit the green fluorescent beams due to the excitation of the blue laser beams.

The white beams may be obtained by mixing the blue laser beams, the red fluorescent beams and the green fluorescent beams in a ratio of about 1:3:3, so it is necessary to ensure that the ratio of the blue laser beams, the red fluorescent beams and the green fluorescent beams emitted from the phosphor wheel 103 is about 1:3:3.

In some embodiments, as shown in FIG. 12A, on the premise of keeping a rotational speed of the phosphor wheel 103 to be constant, if the area of the laser-reflecting region 1032 of the phosphor wheel 103 and the areas of each sub-fluorescence-exciting region are distributed in a ratio of 1:3:3, the blue laser beams, the red fluorescent beams and the green fluorescent beams emitted from the phosphor wheel 103 are mixed to obtain the white beams.

In some embodiments, the area of each sub-fluorescence-exciting region (G1 or G2) is different, and the area of at least one sub-fluorescence-exciting region (G1 or G2) is equal to the area of the laser-reflecting region 1032.

For example, if the white beams can be obtained by mixing the blue laser beams, the red fluorescent beams and the green fluorescent beams in a ratio of 1:2:1, the area of the laser-reflecting region 1032 of the phosphor wheel 103 is equal to the area of the second sub-fluorescence-exciting region G2, and the area of the second sub-fluorescence-exciting region G2 is half of the area of the first sub-fluorescence-exciting region G1.

In some embodiments, the number of sub-fluorescence-exciting regions of the phosphor wheel 103 may further be four, five or more. Colors of the fluorescence beams emitted by each sub-fluorescence-exciting region may be different, or, there may further be at least two sub-fluorescence-exciting regions that emit fluorescence of a same color, and the at least two sub-fluorescence-exciting regions may not be adjacent.

As shown in FIGS. 11A, 11B and 12A, the phosphor wheel 103 may rotate around the rotating shaft Z. As the phosphor wheel 103 rotates, the fluorescence-exiting region 1031 and the laser-reflecting region 1032 are alternately irradiated by the laser beams (e.g., the first laser beam S1 and the second laser beam S2), different fluorescent materials will sequentially and repeatedly generate fluorescent beams of different colors according to a rotation sequence.

In some embodiments, the light-emitting assembly 101 emits the first laser beam S1 and the second laser beam S2 sequentially, and the colors of the first laser beam S1 and the second laser beam S2 are different.

For example, referring to the beam paths shown in FIGS. 11A and 11B, one of the first laser beam S1 and the second laser beam S2 is a blue laser beam, and the other is a red laser beam. The blue laser beam may be used as both the exciting laser source and the laser source of a blue primary color. The red laser is used as the laser source of a red primary color.

Figure 12B:
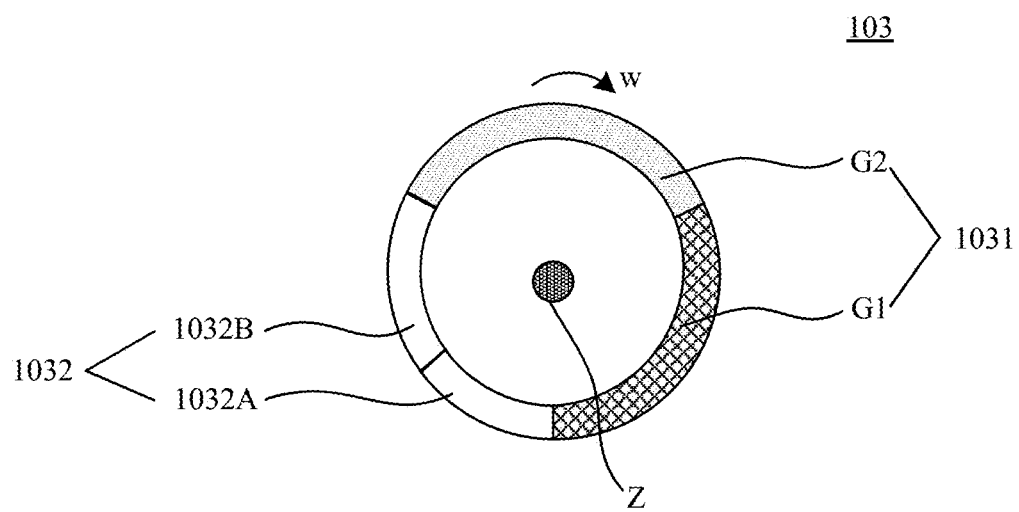
FIG. 12B is a diagram showing a structure of another phosphor wheel, in accordance with some embodiments.

In this case, as shown in FIG. 12B, the phosphor wheel 103 includes the fluorescence-exciting region 1031 and the laser-reflecting region 1032. The fluorescence-exciting region 1031 includes at least a green fluorescence-exciting region, and may further include a yellow fluorescence-exciting region. The laser-reflecting region 1032 includes a blue laser-reflecting region 1032A and a red laser-reflecting region 10326.

The blue laser beam is incident on the fluorescence-exciting region 1031 and the blue laser-reflecting region 1032A, and the red laser beam is incident on the red laser-reflecting region 1032B.

Therefore, as the phosphor wheel 103 rotates, the green fluorescent beam (or the green fluorescent beam and the yellow fluorescent beam), the blue laser beam, and the red laser beam are sequentially emit. In addition, the beams of the three primary colors or the four primary colors are combined by the combining component 102 and then reflected to the laser exit direction of the laser source 100.

It will be noted that, when the laser projection apparatus 10 performs projection display, a speckle effect is usually generated. The speckle effect refers to an effect in which two laser beams emitted by a coherent beam source interfere in space after they scatter when they irradiate a rough object (e.g., the screen of the laser projection apparatus 10), and finally a granular bright and dark spot appears on the screen 50. The speckle effect makes a display effect of the projected image poor, and these bright and dark unfocused spots are in a flickering state in the human eyes, which is prone to dizziness when viewed for a long time.

In some embodiments, the red laser-reflecting region 1032B may further be provided with a scattering material layer, and the scattering material layer may reflect and scatter the red laser beam, thereby improving a dissipation effect of the red laser beam.

In some embodiments, the phosphor wheel 103 includes a second substrate (i.e., a substrate). The second substrate may be a reflective substrate, and the laser-reflecting region 1032 of the phosphor wheel 103 may be a portion of the reflective substrate. For example, the reflective substrate is a metal substrate (e.g., an aluminum substrate), and a surface of a side of the metal substrate facing the laser beams has a mirror surface.

In some embodiments, the fluorescence-exciting region 1031 of the phosphor wheel 103 is located on the reflective substrate, and a surface of a side of the reflective substrate facing the laser beams is a reflective surface. For example, the reflective substrate is coated with the fluorescent material, so as to form the fluorescence-exciting region 1031, and a region on the reflective substrate that is not coated with the fluorescent material forms the laser-reflecting region 1032.

In some embodiments, the second substrate of the phosphor wheel 103 may also be a non-reflective substrate. For example, the second substrate is a ceramic substrate, and a reflective film layer may be disposed on the ceramic substrate. For example, fluorescent materials may be coated on different regions of a surface of the reflective film layer of the second substrate. A region coated with the fluorescent material on the reflective film layer forms the fluorescence-exciting region 1031 of the phosphor wheel 103. A region on the reflective film layer that is not coated with the fluorescent material forms the laser-reflecting region 1032 of the phosphor wheel 103.

In some embodiments, as shown in FIG. 11A, the laser exit surface 1011 of the light-emitting assembly 101 is perpendicular to the laser receiving surface 1033 of the phosphor wheel 103. The laser exit surface 1011 may extend along a Y direction in FIG. 11A, and the laser receiving surface 111 may extend along an X direction in FIG. 11A. The turning component 108 is located in a light-emitting direction of the light-emitting assembly 101, and is configured to reflect the laser beam emitted by the light-emitting assembly 101 to the laser receiving surface 1033 of the fluorescent wheel 103. In some embodiments, the turning component 108 is further configured to split the laser beam emitted by the light-emitting assembly 101. Further, the turning component 108 is configured to adjust distances between laser beams obtained by splitting.

As shown in FIGS. 11A and 11B, the combining component 102 is located between the turning component 108 and the phosphor wheel 103. The combining component 102 is configured to transmit the laser beams emitted by the light-emitting assembly 101 and reflect the laser beams reflected by the phosphor wheel 103 or the fluorescent beams excited by the phosphor wheel 103. The combining component 102 has a first reflecting region 1022A, a second reflecting region 1022B, a first transmitting region 1021A and a second transmitting region 1021B. Moreover, light reflecting regions (i.e., the first reflecting region 1022A and the second reflecting region 1022B) and laser transmitting regions (i.e., the first transmitting region 1021A and the second transmitting region 1021B) of the combining component 102 are alternately arranged. The first reflecting region 1022A is located at an end of the combining component 102 proximate to the phosphor wheel 103. The first transmitting region 1021A is located at an end of the combining component 102 away from the phosphor wheel 103.

Figure 15A:
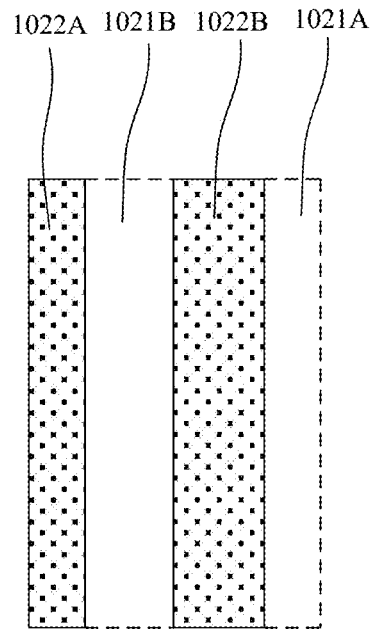
FIG. 15A is a diagram showing a structure of a combining component, in accordance with some embodiments.

In some embodiments, as shown in FIGS. 11A, 11B and 15A, the combining component 102 is a groupware (e.g., the laser transmitting regions being shown in dotted lines in FIGS. 11A, 11B and 15A), and the combining component 102 includes two reflectors arranged independently of each other. The two reflectors are located in the first reflecting region 1022A and the second reflecting region 1022B of the combining component 102 respectively. There is a gap between the two reflectors, and the gap is located in the second transmitting region 1021B of the combining component 102. A side of the reflector away from the gap forms the first transmitting region 1021A. The reflector is a reflector for all wavelength ranges. Alternatively, the reflector is a reflector for a plurality of specific wavelength ranges (e.g., a wavelength range of red light, a wavelength range of yellow light, a wavelength range of green light, or a wavelength range of blue light).

In some embodiments, as shown in FIGS. 11A and 11B, the reflector located in the first reflecting region 1022A and the reflector located in the second reflecting region 1022B are both disposed obliquely to a wheel surface of the phosphor wheel 103 (e.g., a laser receiving surface 1033 of the phosphor wheel 103), and oblique angles of the two reflectors are same and the two reflectors are spaced apart by a second predetermined distance Y2. The two reflectors are spaced apart by the second predetermined distance Y2 to form the second transmitting region 1021B, and the second transmitting region 1021B is configured to allow one of the first laser beam S1 and the second laser beam S2 to pass through. A region at a side of the combining component 102 away from the second transmitting region 1021B constitutes the first transmitting region 1021A. Another of the first laser beam S1 and the second laser beam S2 passes through the first transmitting region 1021A.

For example, the reflector located in the first reflecting region 1022A and the reflector located in the second reflecting region 1022B are both disposed obliquely at 45° with respect to the laser receiving surface 111 of the phosphor wheel 103. The second predetermined distance Y2 is greater than or equal to at least one of a width of the first laser beam S1 or a width of the second laser beam S2, and is less than or equal to a width of an orthogonal projection of any reflector on the laser receiving surface 1033 of the phosphor wheel 103. For example, the second predetermined distance Y2 is greater than or equal to 3 mm, and less than or equal to 12 mm (i.e., 3 mm≤Y2≤12 mm).

Neither the first reflecting region 1022A nor the second reflecting region 1022B is located in the beam paths of the first laser beam S1 and the second laser beam S2, so as to prevent the reflectors in the first reflecting region 1022A and the second reflecting region 1022B from blocking the first laser beam S1 and the second laser beam S2. The first laser beam S1 passes through from a side of the reflector located in the second reflecting region 1022B away from the first reflecting region 1022A (i.e., the first transmitting region 1021A). The second laser beam S2 passes through the gap between the reflectors located in the second reflecting region 1022B and the first reflecting region 1022A (i.e., the second transmitting region 1021B).

The converging lens group 105 is located at a side of the phosphor wheel 103 proximate to the turning component 108, and is disposed in the beam paths where the first laser beam S1 and the second laser beam S2 are incident on the phosphor wheel 103. The converging lens group 105 is configured to converge the laser beams, thereby forming a small beam spot on the phosphor wheel 103. The converging lens group 105 is further configured to collimate the laser beams reflected by the phosphor wheel 103 or the fluorescent beams excited by the phosphor wheel 103, so that the laser beams reflected by the phosphor wheel 103 or the fluorescent beams excited by the phosphor wheel 103 are incident on the combining component 102.

In some embodiments, the first laser beam S1 and the second laser beam S2 emitted by the light-emitting assembly 101 are incident at different positions of the converging lens group 105 respectively, and are asymmetrical with respect to an optical axis of the converging lens group 105, and both are incident on the phosphor wheel 103 after being converged by the converging lens group 105.

According to the law of reflection, in a case where the first laser beam S1 and the second laser beam S2 are asymmetric with respect to the optical axis of the converging lens group 105, a beam path of a first fluorescent beam E1 generated by the first laser beam S1 does not overlap with a beam path of the second laser beam S2, and a beam path of a second fluorescent beam E2 generated by the second laser beam S2 does not overlap with a beam path of the first laser beam S1. As a result, the first laser beam S1 and the second laser beam S2 may be transmitted by the combining component 102, and the first fluorescent beam E1 and the second fluorescent beam E2 may be reflected by the combining component 102.

In some embodiments, the converging lens group 105 is disposed between the combining component 102 and the phosphor wheel 103.

The converging lens group 105 includes a convex lens, and a convex arc surface of the convex lens protrudes toward the light-emitting assembly 101.

In a case where the converging lens group 105 includes a plurality of convex lenses, the plurality of convex lenses may be arranged in sequence along an arrangement direction of the combining component 102 and the phosphor wheel 103, and optical axes of the plurality of convex lenses are collinear. In this way, the laser beams entering the converging lens group 105 may be converged on the phosphor wheel 103 more accurately.

In some embodiments, as shown in FIGS. 11A and 11B, the converging lens group 105 includes two convex lenses, that is, one plano-convex lens 1051 and one plano-convex lens 1052.

Alternatively, the converging lens group 105 includes one hyperspherical convex lens and one plano-convex lens.

Alternatively, the converging lens group 105 includes one hyperspherical convex lens and one positive meniscus lens.

Some embodiments of the present disclosure are mainly described by taking an example in which the converging lens group 105 includes two convex lenses (i.e., the plano-convex lens 1051 and the plano-convex lens 1052 in FIGS. 11A and 11B), however, this should not be construed as a limitation of the present disclosure.

The light-emitting assembly 101, turning component 108, the combining component 102, the converging lens group 105 and the phosphor wheel 103 are arranged in an "L" shape. That is, the laser exit direction of the light-emitting assembly 101 (e.g., the X direction in FIG. 11A) is substantially perpendicular to the arrangement direction of the combining component 102, the converging lens group 105 and the phosphor wheel 103 (e.g., the Y direction in FIG. 11A). The laser beams emitted by the light-emitting assembly 101 may be reflected by the turning component 108 toward the transmitting portions of the combining component 102.

In some embodiments, the turning component 108 includes one turning mirror. The turning mirror is configured to adjust a transmitting direction of the laser beams emitted by the light-emitting assembly 101.

In some embodiments, the turning component 108 includes a plurality of turning mirrors. The plurality of turning mirrors are configured to split the laser beam emitted by the one light-emitting assembly 101, and a distance between the obtained split laser beams is adjusted through adjusting a position of each turning mirror.

The plurality of turning mirrors are arranged along the laser exit direction of the light-emitting assembly 101 (referring to the X direction in FIG. 11A). Distances between the plurality of turning mirrors and the laser exit surface 1011 of the light-emitting assembly 101 are all different. The plurality of turning mirrors of the turning component 108 and the plurality of transmitting portions of the combining component 102 may be arranged in a one-to-one correspondence manner, so as to ensure that each turning mirror reflects the incident laser beam to the corresponding transmitting portion.

For ease of description, some embodiments of the present disclosure are mainly described by taking an example in which the turning component 108 includes two turning mirrors, however, this should not be construed as a limitation of the present disclosure.

For example, as shown in FIGS. 11A and 11B, the turning component 108 includes two turning mirrors, that is, a first turning mirror 1081 and a second turning mirror 1082. The first turning mirror 1081 and the second turning mirror 1082 are configured to reflect the first laser beam S1 and the second laser beam S2 emitted by the light-emitting assembly 101. Moreover, before entering the combining component 102, the first laser beam S1 and the second laser beam S2 are spaced apart by the first predetermined distance Y1. The range of the first predetermined distance Y1 may be referred to the above description, which will not be repeated herein.

The second turning mirror 1082 proximate to the laser exit surface 1011 of the light-emitting assembly 101 corresponds to the second transmitting portion 1021B of the combining component 102. The second turning mirror 1082 is configured to reflect the laser beam incident thereon into the second transmitting portion 1021B. The first turning mirror 1081 away from the laser exit surface 1011 of the light-emitting assembly 101 corresponds to the first transmitting portion 1021A of the combining component 102. The first turning mirror 1081 is configured to reflect the laser beam incident thereon into the first transmitting portion 1021A.

In some embodiments, a distance between each turning mirror of the turning component 108 and the laser exit surface 1011 of the light-emitting assembly 101 includes a minimum distance between any point on a surface of the turning mirror proximate to the light-emitting assembly 101 and the laser exit surface 1011 of the light-emitting assembly 101.

As shown in FIG. 11B, a minimum distance D1 between the first turning mirror 1081 and the laser exit surface 1011 of the light-emitting assembly 101 is greater than a maximum distance D4 between the second turning mirror 1082 and the laser exit surface 1011 of the light-emitting assembly 101. Therefore, a distance between any point of a surface of the first turning mirror 1081 proximate to the light-emitting assembly 101 and the laser exit surface 1011 of the light-emitting assembly 101 is not equal to a distance between any point of a surface of the second turning mirror 1082 proximate to the light-emitting assembly 101 and the laser exit surface 1011 of the light-emitting assembly 101.

For example, as shown in FIG. 11B, the minimum distance between the first turning mirror 1081 and the laser exit surface 1011 of the light-emitting assembly 101 is D1. A maximum distance between the first turning mirror 1081 and the laser exit surface 1011 of the light-emitting assembly 101 is D2. A minimum distance between the second turning mirror 1082 and the laser exit surface 1011 of the light-emitting assembly 101 is D3. The maximum distance between the second turning mirror 1082 and the laser exit surface 1011 of the light-emitting assembly 101 is D4. D1 is not equal to D3 and D4, and D4 is not equal to D1 and D2.

The two turning mirrors satisfy that at least a portion of an orthogonal projection of the first turning mirror 1081 on the laser exit surface 1011 of the light-emitting assembly 101 does not overlap with an orthogonal projection of the second turning mirror 1082 on the laser exit surface 1011 of the light-emitting assembly 101.

At least a surface of the turning mirror facing towards the laser exit surface 1011 of the light-emitting assembly 101 is a reflective surface.

In some embodiments, both surfaces of the turning mirror are the reflective surfaces. Alternatively, only the surface of the turning mirror facing towards the laser exit surface 1011 of the light-emitting assembly 101 is the reflective surface.

Figure 16A:
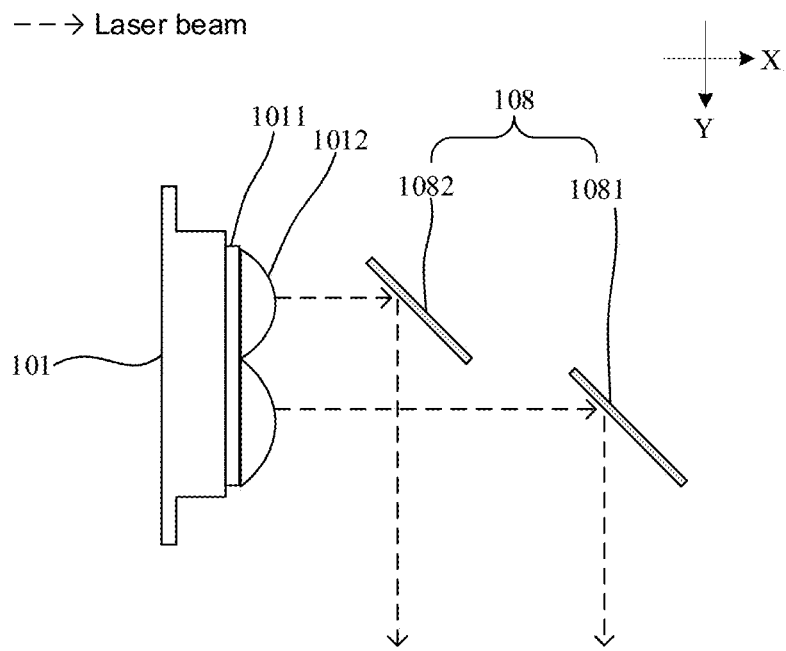
FIG. 16A is a diagram showing a beam path of a light-emitting assembly, in accordance with some embodiments.
Figure 16B:
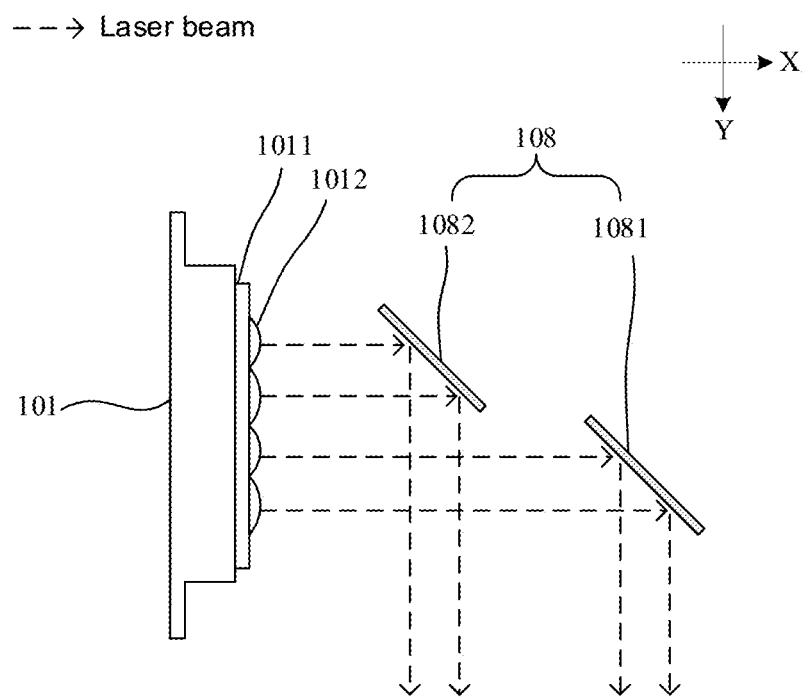
FIG. 16B is a diagram showing a beam path of another light-emitting assembly, in accordance with some embodiments.

In some embodiments, as shown in FIGS. 16A and 16B, the light-emitting assembly 101 may include a plurality of light-emitting chips 1012. Each light-emitting chip 1012 may independently emit a laser beam, and a plurality of laser beams may be incident on two turning mirrors of the turning component 108.

For example, in a case where the light-emitting assembly 101 is the MCL device, the MCL device may include a plurality of rows or columns of light-emitting chips 1012. The first turning mirror 1081 is disposed on beam paths of a continuous portion of rows of the light-emitting chips 1012 among the plurality of rows of light-emitting chips 1012. The second turning mirror 1082 is disposed on beam paths of the remaining portion of rows of light-emitting chips 1012 among the plurality of rows of light-emitting chips 1012. Alternatively, the first turning mirror 1081 is disposed on beam paths of a continuous portion of columns of the light-emitting chips 1012 among the plurality of columns of light-emitting chips 1012. The second turning mirror 1082 is disposed on beam paths of the remaining portion of columns of light-emitting chips 1012 among the plurality of columns of light-emitting chips 1012.

For example, the MCL device may include even-numbered rows or even-numbered columns of light-emitting chips 1012. The first turning mirror 1081 is disposed on beam paths of continuous N/2 rows of light-emitting chips 1012 among the even-numbered N rows of light-emitting chips 1012. The second turning mirror 1082 is disposed on beam paths of the remaining continuous N/2 rows of light-emitting chips 1012 among the even-numbered N rows of light-emitting chips 1012. Alternatively, the first turning mirror 1081 is disposed on beam paths of continuous N/2 columns of light-emitting chips 1012 among the even-numbered N columns of light-emitting chips 1012. The second turning mirror 1082 is disposed on beam paths of the remaining continuous N/2 columns of light-emitting chips 1012 among the even-numbered N columns of light-emitting chips 1012.

In some embodiments, as shown in FIGS. 16A and 17A, the light-emitting assembly 101 includes two rows and six columns of light-emitting chips 1012. A row direction refers to an X direction in FIG. 16A or 17A, and a column direction refers to a Y direction in FIG. 16A or 17A. The second turning mirror 1082 is disposed on beam paths of a first row of the light-emitting chips 1012, and the first turning mirror 1081 is disposed on beam paths of a second row of the light-emitting chips 1012. The two turning mirrors may turn directions of the laser beams emitted by the light-emitting assembly 101 to form two independent laser beams. In addition, a turning mirror may also be disposed on beam paths of every three columns of light-emitting chips 1012 of the light-emitting assembly 101.

In some embodiments, as shown in FIGS. 16B and 17B, different from FIG. 16A, the light-emitting assembly 101 in FIG. 16B includes four rows and six columns of light-emitting chips 1012. The second turning mirror 1082 is disposed on beam paths of a first row and a second row of the light-emitting chips 1012. The first turning mirror 1081 is disposed on beam paths of a third row and a fourth row of the light-emitting chips 1012.

In some embodiments, the light-emitting assembly 101 may emit only one laser beam. The one laser beam may be incident on the two turning mirrors 1081 and 1082 in the turning component 108 and split by the two turning mirrors 1081 and 1082. Each turning mirror reflects a portion of the one laser beam that is incident on the turning mirror respectively, therefore, the one laser beam may be divided into the first laser beam S1 and the second laser beam S2 through the two turning mirrors.

Figure 16C:
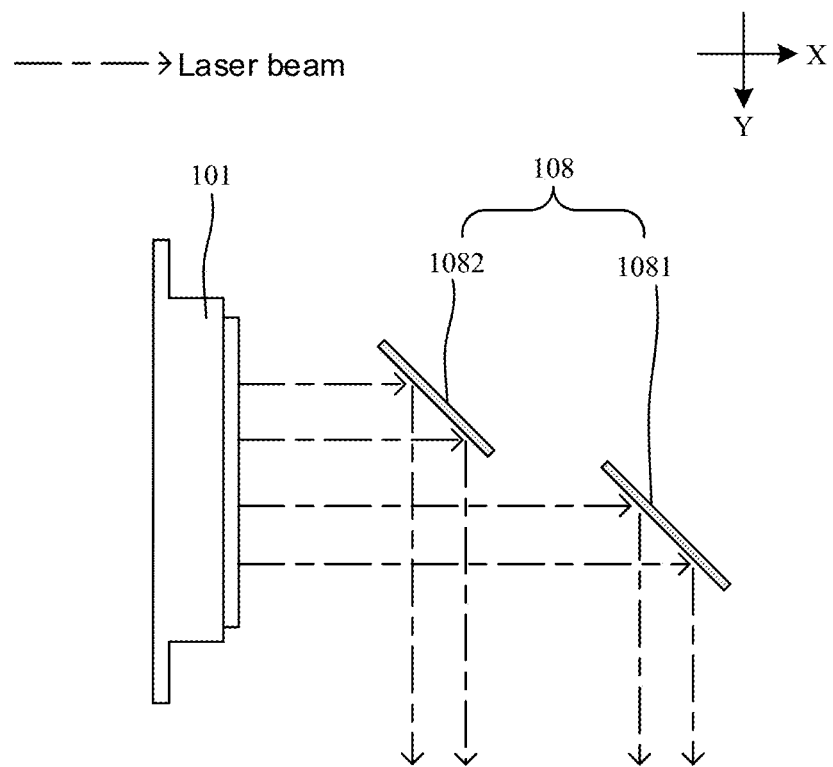
FIG. 16C is a diagram showing a beam path of yet another light-emitting assembly, in accordance with some embodiments.

For example, as shown in FIG. 16C, the greater the distance between the two turning mirrors of the turning component 108 in the light-emitting direction of the light-emitting assembly 101 (i.e., an X direction in FIG. 16C), the larger the distance between the two laser beams obtained by splitting the one laser beam emitted by the light-emitting assembly 101. Therefore, the distance between the laser beams reflected by each of the turning mirrors may be adjusted by adjusting the distance between the two turning mirrors in the light-emitting direction of the light-emitting assembly 101.

In some embodiments, the first laser beam S1 and the second laser beam S2 exit from the light-emitting assembly 101 simultaneously, which may be regarded as simultaneously being incident on the two turning mirrors of the turning component 108. After being reflected by the two turning mirrors, the first laser beam S1 and the second laser beam S2 respectively pass through different transmitting regions of the combining component 102, and are incident on the converging lens group 105 at different angles. After being converged by the converging lens group 105, the first laser beam S1 and the second laser beam S2 excite the fluorescence-exciting region 1031 or are reflected by the laser-reflecting region 1032 of the phosphor wheel 103.

For example, as shown in FIG. 11A, as the phosphor wheel 103 rotates, in a case where the fluorescence-exciting region 1031 is irradiated by the first laser beam S1 and the second laser beam S2, the fluorescence-exciting region 1031 may be excited to generate the first fluorescent beam E1 corresponding to the first laser beam S1 and the second fluorescent beam E2 corresponding to the second laser beam S2 respectively. The excited first fluorescent beam E1 and the excited second fluorescent beam E2 are both reflected by the phosphor wheel 103 and transmitted through the converging lens group 105.

The first fluorescent beam E1 transmits through the converging lens group 105 and then incident on the first reflecting region 1022A, and the second fluorescent beam E2 transmits through the converging lens group 105 and then incident on the second reflecting region 1022B. The first fluorescent beam E1 and the second fluorescent beam E2 may be regarded as being excited simultaneously, and are reflected by the phosphor wheel 103 and are converged by the converging lens group 105. Therefore, the first fluorescent beam E1 and the second fluorescent beam E2 are incident on the first reflecting region 1022A and the second reflecting region 1022B simultaneously, and are reflected by the first reflecting region 1022A and the second reflecting region 1022B toward the beam outlet of the laser source 100. Here, colors of the first fluorescent beam E1 and the second fluorescent beam E2 are different from the colors of the laser beams emitted by the light-emitting assembly 101.

As shown in FIG. 11B, as the phosphor wheel 103 rotates, when the laser-reflecting region 1032 is irradiated by the first laser beam S1 and the second laser beam S2, the laser-reflecting region 1032 reflects the first laser beam S1 and the second laser beam S2. The reflected first laser beam S1 is transmitted through the converging lens group 105 and then incident on the first reflecting region 1022A, and the reflected second laser beam S2 is transmitted through the converging lens group 105 and then incident on the second reflecting region 1022B. The first reflecting region 1022A and the second reflecting region 1022B reflect the laser beams toward the beam outlet of the laser source 100.

The colors of the first fluorescent beam E1 and the second fluorescent beam E2 are different from the colors of the laser beams emitted by the light-emitting assembly 101. Therefore, the laser beams and the fluorescent beams with different colors are reflected toward the beam outlet of the laser source 100 by the combining component 102, so that the beam outlet of the laser source 100 sequentially exits the laser beams and the fluorescent beams with different colors.

Since the fluorescent beams excited by the fluorescence-exciting region 1031 may exit in all directions, and light-emitting angles of the fluorescent beams are large, the fluorescent beams excited by the fluorescence-exciting region 1031 may not only exit to the light reflecting regions in the combining component 102, but also may exit to the laser transmitting regions in the combining component 102.

In some embodiments, the laser exit direction of the laser source 100 (e.g., the X direction in FIG. 11A) may be perpendicular to the arrangement direction (i.e., the Y direction) of the combining component 102, the converging lens group 105 and the fluorescent wheel 103.

In some embodiments, as shown in FIG. 11A, a line connecting a position C where the first laser beam S1 is incident on the converging lens group 105 and a convergence position E where the first laser beam S1 converges on the phosphor wheel 103 is a first connecting line CE, and an acute angle of included angles between the first connecting line CE and the optical axis H of the converging lens group 105 is α. A line connecting a position D where the second laser beam S2 is incident on the converging lens group 105 and a convergence position E where the second laser beam S2 converges on the phosphor wheel 103 is a second connecting line DE, and an acute angle of included angles between the second connecting line DE and the optical axis H of the converging lens group 105 is β. The included angle α and the included angle β satisfy that a is not equal to p (i.e., α≠β).

In some embodiments, as shown in FIG. 11B, a distance L1 between the position C where the first laser beam S1 is incident on the converging lens group 105 and the optical axis H of the converging lens group 105 is different from a distance L2 between the position D where the second laser beam S2 is incident on the converging lens group 105 and the optical axis H of the converging lens group 105, that is, L1 is not equal to L2 (i.e., L1≠L2).

It will be noted that, in a case where the included angles α and β are different, or in a case where the distances L1 and L2 are different, the first laser beam S1 and the second laser beam S2 may be located at both sides of the optical axis H, or may be located at a same side of the optical axis H. Some embodiments of the present disclosure are mainly described by taking an example in which the first laser beam S1 and the second laser beam S2 are located at both sides of the optical axis H respectively.

The converging lens group 105 converges the first laser beam S1 and the second laser beam S2 on the laser receiving surface 1033 of the phosphor wheel 103, so as to form a small beam spot. In a case where the laser-reflecting region 1032 of the phosphor wheel 103 is irradiated by the first laser beam S1 and the second laser beam S2, the first laser beam S1 and the second laser beam S2 may be reflected by the laser-reflecting region 1032 of the phosphor wheel 103. After being transmitted through the converging lens group 105, the first laser beam S1 and the second laser beam S2 reflected by the laser-reflecting region 1032 are incident on the first reflecting region 1022A and the second reflecting region 10228, and are reflected by the first reflecting region 1022A and the second reflecting region 10228 toward the beam outlet of the laser source 100.

It will be noted that, neither the first laser beam S1 nor the second laser beam S2 passes through the optical axis H of the converging lens group 105, and the first laser beam S1 and the second laser beam S2 are not symmetrical with respect to the optical axis H of the converging lens group 105. In a case where the laser beams are incident on the converging lens group 105 along the optical axis H of the converging lens group 105, there will be no change in optical characteristics of the laser beams. If the laser beams passing through the laser transmitting regions in the combining component 102 pass through the converging lens group 105 along the optical axis H of the converging lens group 105 and reach the phosphor wheel 103, light exiting from the phosphor wheel 103 also passes through the converging lens group 105 along the optical axis H of the converging lens group 105 and then passes through the laser transmitting regions again. As a result, the laser beams will not reach the light reflecting regions in the combining component 102, and will not be reflected to the beam outlet of the laser source 100 by the light reflecting regions. Therefore, in some embodiments, the laser beams emitted by the light-emitting assembly 101 and transmitted through the laser transmitting regions need to be irradiated to a region other than the optical axis H of the converging lens group 105.

In some embodiments, referring to FIGS. 11A and 11B, the included angle α between the first laser beam S1 and the optical axis H of the converging lens group 105 is greater than the included angle β between the second laser beam S2 and the optical axis H of the converging lens group 105, that is, α>β. In this way, the first laser beam S1 and the second laser beam S2 may be incident on the converging lens group 105 (e.g., a lens of the converging lens group 105 that receives the laser beams first) at different incident angles. Moreover, according to the law of reflection, a reflection beam path of the first laser beam S1 will not overlap with a reflection beam path of the second laser beam S2, and the reflection beam path of the first laser beam S1 will not overlap with an incident beam path of the second laser beam S2, the reflection beam path of the second laser beam S2 will not overlap with an incident beam path of the first laser beam S1. As a result, the first laser beam S1 and the second laser beam S2 reflected by the laser-reflecting region 1032 of the phosphor wheel 103 may be incident on the first reflecting region 1022A and the second reflecting region 1022B respectively along different reflection beam paths, and reflected by the first reflecting region 1022A and the second reflecting region 1022B toward the beam outlet of the laser source 100.

Figure 13A:
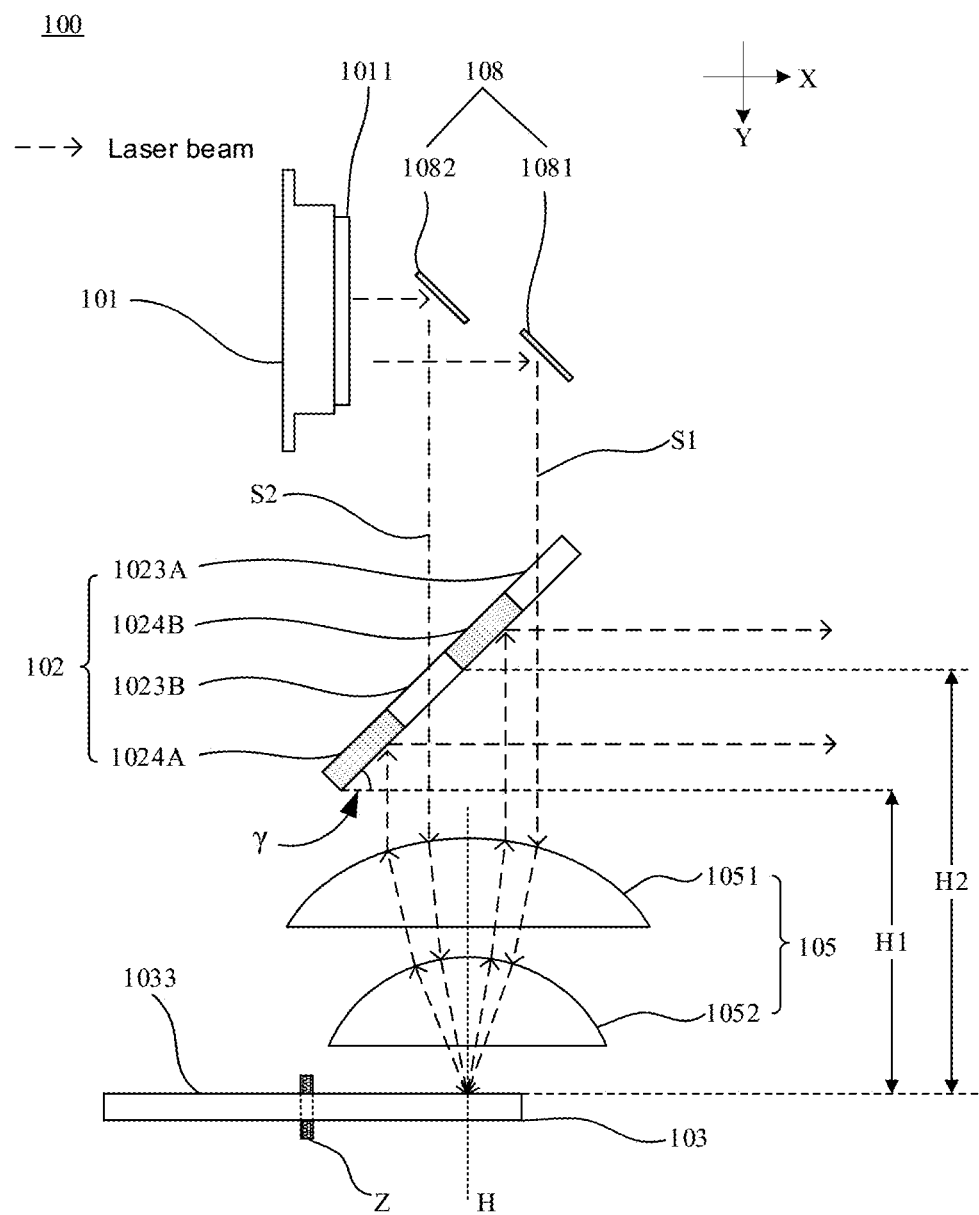
FIG. 13A is a diagram showing a beam path of yet another laser source, in accordance with some embodiments.
Figure 15B:
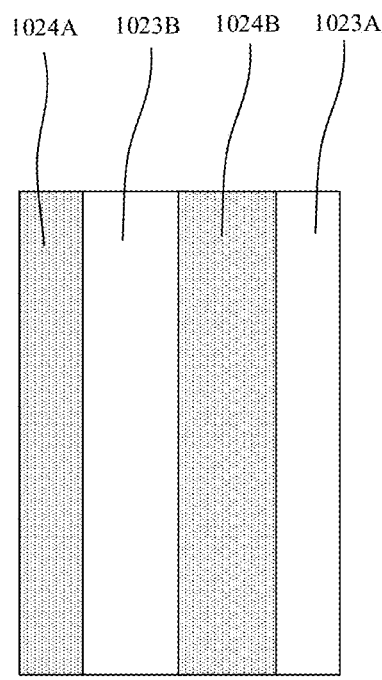
FIG. 15B is a diagram showing a structure of another combining component, in accordance with some embodiments.

In some embodiments, as shown in FIGS. 13A and 15B, the combining component 102 may also be an integral member. The combining component 102 is configured to transmit the laser beams emitted by the light-emitting assembly 101 and reflect the laser beams reflected by the phosphor wheel 103 or the fluorescent beams excited by the phosphor wheel 103. The combining component 102 includes a first reflecting portion 1024A, a second reflecting portion 1024B, a first transmitting portion 1023A and a second transmitting portion 1023B. A plurality of reflecting portions and a plurality of transmitting portions are alternately arranged. The first reflecting portion 1024A is located in the first reflecting region 1022A, and the second reflecting portion 1024B is located in the second reflecting region 1022B. The first transmitting portion 1023A is located in the first transmitting region 1021A, and the second transmitting portion 1023B is located in the second transmitting region 1021B.

In some embodiments, a number of the transmitting portions of the combining component 102 is greater than or equal to a number of the laser beams emitted by the light-emitting assembly 101, and the number of the transmitting portions may be less than or equal to a number of the reflecting portions. Some embodiments of the present disclosure are mainly described by taking an example in which the light-emitting assembly 101 emits two laser beams and the combining component 102 includes two transmitting portions and two reflecting portions, however, this should not be construed as a limitation of the present disclosure.

For example, as shown in FIG. 13A, the combining component 102 is disposed obliquely at about 45° with respect to the laser receiving surface 1033 of the phosphor wheel 103. The combining component 102 includes the first transmitting portion 1023A corresponding to the first laser beam S1 and the second transmitting portion 1023B corresponding to the second laser beam S2. The first transmitting portion 1023A is located at the end of the combining component 102 away from the phosphor wheel 103, and the first reflecting portion 1024A is located at the end of the combining component 102 proximate to the phosphor wheel 103. The second transmitting portion 1023B and the second reflecting portion 1024B are located between the first reflecting portion 1024A and the first transmitting portion 1023A, and the transmitting portions and the reflecting portions of the combining component 102 are alternately arranged.

It will be noted that, considering a process and installation accuracy, an included angle between the combining component 102 and the laser receiving surface 1033 of the phosphor wheel 103 may have a tolerance of plus or minus 3°. That is, an oblique angle γ (as shown in FIG. 13A)

between the combining component 102 and laser receiving surface 1033 of the phosphor wheel 103 is greater than or equal to 42°, and less than or equal to 48° (i.e., 42°≤γ≤48°).

In some embodiments, the transmitting portions and the reflecting portions of the combining component 102 are arranged in a one-to-one correspondence manner. A laser beam transmitted through a transmitting portion is incident on a reflecting portion corresponding to the transmitting portion of the combining component 102 after being reflected by the laser-reflecting region 1032 of the phosphor wheel 103. After a laser beam transmitted through a transmitting portion is incident on the fluorescence-exciting region 1031 of the phosphor wheel 103, the excited fluorescent beam is reflected by the phosphor wheel 103 toward a reflecting portion corresponding to the transmitting portion of the combining component 102.

For example, referring to FIG. 13A, the first transmitting portion 1023A of the combining component 102 corresponds to the first reflecting portion 1024A, and the second transmitting portion 1023B of the combining component 102 corresponds to the second reflecting portion 1024B.

In some embodiments, the transmitting portion and the corresponding reflecting portion of the combining component 102 are located at both sides of the optical axis H of the converging lens group 105 respectively. At least a portion of an orthogonal projection of the transmitting portion of the combining component 102 on the laser receiving surface 1033 of the phosphor wheel 103, and at least a portion of an orthogonal projection of the corresponding reflecting portion on the laser receiving surface 1033 of the phosphor wheel 103 are symmetrical with respect to the optical axis H.

For example, as shown in FIG. 13A, the first reflecting portion 1024A corresponds to the first transmitting portion 1023A, and the second reflecting portion 1024B corresponds to the second transmitting portion 1023B. At least a portion of an orthogonal projection of the first transmitting portion 1023A on the laser receiving surface 1033 of the phosphor wheel 103, and at least a portion of an orthogonal projection of the corresponding first reflecting portion 1024A on the laser receiving surface 1033 of the phosphor wheel 103 are symmetrical with respect to the optical axis H. At least a portion of an orthogonal projection of the second transmitting portion 1023B on the laser receiving surface 1033 of the phosphor wheel 103, and at least a portion of an orthogonal projection of the corresponding second reflecting portion 10246 on the laser receiving surface 111 of the phosphor wheel 103 are symmetrical with respect to the optical axis H.

In some embodiments, in a case where the combining component 102 includes the plurality of transmitting portions and the plurality of reflecting portions, the plurality of transmitting portions may be located at both sides of the optical axis H, and are asymmetrical with respect to the optical axis H.

For example, as shown in FIG. 13A, the second transmitting portion 1023B and the corresponding second reflecting portion 1024B are located at both sides of the optical axis H of the converging lens group 105. The first transmitting portion 1023A and the corresponding first reflecting portion 1024A are located at both sides of the optical axis H of the converging lens group 105. The second transmitting portion 1023B and the first transmitting portion 1023A are also located at both sides of the optical axis H of the converging lens group 105, and are asymmetrical with respect to the optical axis H. In this way, it may be ensured that the reflecting beam path of the laser beam incident on one transmitting portion will not pass through another transmitting portion.

In some embodiments, as shown in FIG. 15B, an area of the first transmitting portion 1023A of the combining component 102 may be less than an area of the second transmitting portion 1023B, and an area of the first reflecting portion 1024A may be less than an area of the second reflecting portion 1024B.

For example, as shown in FIG. 13A, the first turning mirror 1081 and the second turning mirror 1082 are inclined to the laser exit surface 1011 of the light-emitting assembly 101 at a substantially 45° angle. Therefore, an optical path of a laser beam (e.g., the first laser beam S1) from the light-emitting assembly 101 to the first turning mirror 1081 and then to the first transmitting portion 1023A is shorter than an optical path of a laser beam (e.g., the second laser beam S2) from the light-emitting assembly 101 to the second turning mirror 1082 and then to the second transmitting portion 1023B.

A distance H1 between the first reflecting portion 1024A and the laser receiving surface 1033 of the phosphor wheel 103 is less than a distance H2 between the second reflecting portion 1024B and the laser receiving surface 1033 of the phosphor wheel 103. An optical path of light (e.g., the first laser beam S1 or the first fluorescent beam E1) from the phosphor wheel 103 to the first reflecting portion 1024A is shorter than an optical path of light (e.g., the second laser light S2 or the second fluorescent beam E2) from the phosphor wheel 103 to the second reflecting portion 1024A.

The shorter the optical path of light, the smaller the beam spot formed. Thus, a beam spot on the first transmitting portion 1023A is smaller than a beam spot on the second transmitting portion 1023B, and a beam spot on the first reflecting portion 1024A is smaller than a beam spot on the second reflecting portion 1024B.

Therefore, the first transmitting portion 1023A only needs a small area to transmit the laser beam of the light-emitting assembly 101, and the first reflecting portion 1024A only needs a small area to reflect the incident laser beam or fluorescent beam, so the area of the first transmitting portion 1023A may be less than the area of the second transmitting portion 1023B, and the area of the first reflecting portion 1024A may be less than the area of the second reflecting portion 1024B. Similarly, as shown in FIG. 15, in the case where the combining component 102 includes two reflectors arranged independently from each other, the area of the first transmitting region 1021A may be less than the area of the second transmitting region 1021B, and the area of the first reflecting region 1022A may be less than the area of the second reflecting region 1022B.

The first laser beam S1 and the second laser beam S2 are irradiated to different positions of the converging lens group 105, and are incident on a substantially same position of the phosphor wheel 103 after being converged, so as to excite the fluorescence-exciting region 1031 of the phosphor wheel 103, or be reflected by the laser-reflecting region 1032 of the phosphor wheel 103. The first laser beam S1 and the second laser beam S2 reflected by the phosphor wheel 103, and the first fluorescent beam E1 and the second fluorescent beam E2 excited by the phosphor wheel 103 all sequentially exit to the first reflecting portion 1024A and the second reflecting portion 1024A, and are reflected by the first reflecting portion 1024A and the second reflecting portion 1024B toward the beam outlet of the laser source 100, so that the beams of three primary colors are sequentially output to form the illumination beams.

Since the laser beams are high-energy beams, if an energy density of a single laser beam is increased to increase a luminous power of the fluorescent beam, not only will the reliability of an optical element in the beam path be reduced, but also the optical element needs to be heat-resistant, thereby resulting in an increase in a cost of the optical path structure. Moreover, it is also possible to reduce a conversion efficiency of the fluorescent beam due to that the irradiation of light beam with a high energy density causes a heat dissipation problem of the phosphor wheel 103.

To this end, in some embodiments of the present disclosure, by providing two laser beams, and making the two laser beams asymmetrical with respect to the optical axis of each optical element, so that different two laser beams irradiate at different positions of a same optical element in the beam path of the laser beams, the problem of aging or performance degradation caused by localized exposure of the optical element to high-energy beams over a long period of time may be improved.

In addition, by making the positions where the two laser beams irradiate the converging lens group 105 asymmetrical with respect to the optical axis H, angles of the laser beams incident on the phosphor wheel 103 are also not same (i.e., a #8), thereby avoiding a situation that: the first laser beam S1 is reflected by the laser-reflecting region 1032 into the transmitting portion where the second laser beam S2 is incident on, when the first laser beam S1 converges on the laser-reflecting region 1032 of the phosphor wheel 103; or avoiding a situation that the second laser beam S2 is reflected by the laser-reflecting region 1032 into the transmitting portion where the first laser beam S1 is incident on, when the second laser beam S2 converges on the laser-reflecting region 1032 of the phosphor wheel 103. In a case where the two laser beams converge on the laser-reflecting region 1032 of the phosphor wheel 103, the two laser beams are transmitted through the converging lens group 105 again after being reflected, and exit according to the law of reflection.

Similarly, in a case where the two laser beams converge on the fluorescence-exciting region 1031 of the phosphor wheel 103, the two laser beams excite the fluorescence-exciting region 1031 to generate two fluorescent beams. After the two fluorescent beams are reflected by the phosphor wheel 103, they exit to different reflecting portions (i.e., the first reflecting portion 1024A and the second reflecting portion 10246) through the converging lens group 105. The reflecting portions may reflect the two laser beams and the two fluorescent beams in a same direction (i.e., the beam outlet of the laser source 100), so as to accomplish combination of beams.

Therefore, as the phosphor wheel 103 rotates, the laser source 100 may sequentially output the laser beams and the fluorescent beams.

Moreover, in some embodiments of the present disclosure, by arranging the laser-reflecting region 1032 on the phosphor wheel 103, there is no need to provide the transmitting region of the phosphor wheel 103 and the relay loop 110 (as shown in FIG. 10) cooperated with the transmitting region. As a result, the optical elements of the laser source 100 are few, the optical path structure is compact, and not only the high luminous power may be achieved, but also the volume of the laser source 100 may be reduced.

For example, as shown in FIG. 10, if the phosphor wheel 103 includes the transmitting region, it is necessary to additionally provide the relay loop 110 formed by at least three turning mirror 108A, 108B and 108C, so as to reflect the laser beams passing through the transmitting region of the phosphor wheel 103 into the beam outlet of the laser source 100. The relay loop 110 will increase a number of optical elements of the laser source 100, which is not conducive to a miniaturization of the laser projection apparatus.

In some embodiments, in order to improve the utilization rate of the fluorescent beams, the transmitting portions of the combining component 102 may reflect light of a different color from the first laser beam S1 and the second laser beam S2. The transmitting portions of the combining component 102 are configured to transmit the laser beams emitted by the light-emitting assembly 101 and reflect the fluorescent beams excited by the fluorescence-exciting region 1031 of the phosphor wheel 103. The reflecting portions of the combining component 102 are configured to reflect the laser beams reflected by the laser-reflecting region 1032 of the phosphor wheel 103 and the fluorescent beams excited by the fluorescence-exciting region 1031 of the phosphor wheel 103.

Figure 18:
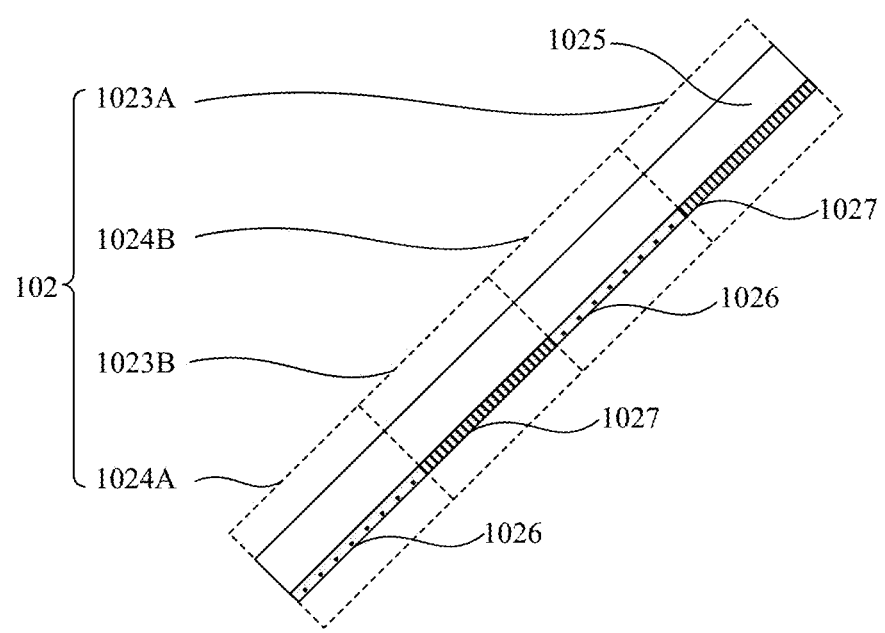
FIG. 18 is a diagram showing a structure of yet another combining component, in accordance with some embodiments.

In some embodiments, as shown in FIG. 18, the combining component 102 includes a first substrate 1025, a coating film 1026 and a dichroic film 1027 disposed on the first substrate 1025 separately. The first substrate 1025 may be a transparent substrate. The coating film 1026 is located on a surface of at least one side of parts of the first substrate 1025 which are corresponding to the reflecting portions. That is, the coating film 1026 is located at the parts of the first substrate 1025 corresponding to the reflecting portions and on a surface of a side of the first substrate 1025 proximate to the converging lens group 105. Alternatively, the coating film 1026 is located at the parts of the first substrate 1025 corresponding to the reflecting portions and on a surface of a side of the first substrate 1025 away from the converging lens group 105. The coating film 1026 may be a reflective film for all wavelength ranges. Alternatively, the coating film 1026 may be a reflective film for at least one of the wavelength range of red light, the wavelength range of green light, and the wavelength range of the blue light.

The dichroic film 1027 is located on a surface of at least one side of the parts of the first substrate 1025 which are corresponding to the transmitting portions. That is, the dichroic film 1027 is located at the parts of the first substrate 1025 corresponding to the transmitting portions and on a surface of a side of the first substrate 1025 proximate to the converging lens group 105. Alternatively, the dichroic film 1027 is located at the parts of the first substrate 1025 corresponding to the transmitting portions and on a surface of a side of the first substrate 1025 away from the converging lens group 105. The dichroic film 1027 is configured to transmit blue light and reflect at least one of red light, yellow light, or green light.

For example, if the fluorescent beams exiting from the fluorescence-exciting region 1031 of the phosphor wheel 103 to the combining component 102 include red light, since the dichroic film 1027 is provided on the surface of the first substrate 1025 corresponding to the transmitting portions, in a case where the fluorescent beams are incident on the transmitting portions, the fluorescent beams will be reflected by the dichroic film 1027 into the beam outlet of the laser source 100, thereby improving the utilization rate of the fluorescent beams.

In some embodiments, portions of the first substrate 1025 of the combining component 102 corresponding to the reflecting portions are reflective material members. Portions of the first substrate 1025 in the combining component 102 corresponding to the transmitting portions are material members with dichroism (e.g., a dichroic lens). The material member with dichroism is configured to transmit blue light and reflect at least one of red light, yellow light, and green light. In this way, there is no need to provide the coating film 1026 and the dichroic film 1027.

Figure 19:
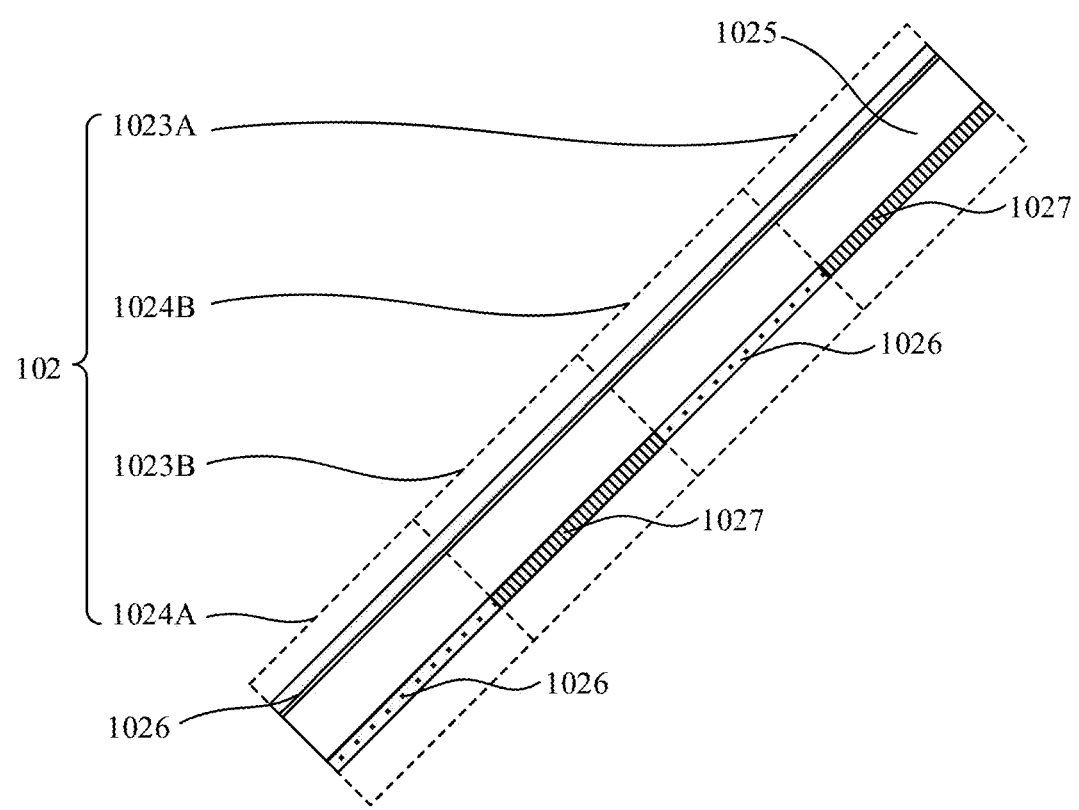
FIG. 19 is a diagram showing a structure of yet another combining component, in accordance with some embodiments.

In some embodiments, as shown in FIG. 19, the combining component 102 further includes an anti-reflection film 1028. The anti-reflection film 1028 is located on the surface of the first substrate 1025 away from the converging lens group 105. Alternatively, the anti-reflection film 1028 is located at the parts of the first substrate 1025 that are corresponding to the transmitting portions and on the surface of the first substrate 1025 away from the converging lens group 105. The anti-reflection film 1028 may increase transmittance of light of a full spectrum, or the anti-reflection film 1028 only increases transmittance of the laser beams (e.g., the blue laser beams) emitted by the light-emitting assembly 101, which is not limited in the present disclosure.

In FIGS. 18 and 19, the first transmitting portion 1023A, the second transmitting portion 1023B, the first reflecting portion 1024A, and the second reflecting portion 1024B are shown with dotted frames.

Figure 13B:
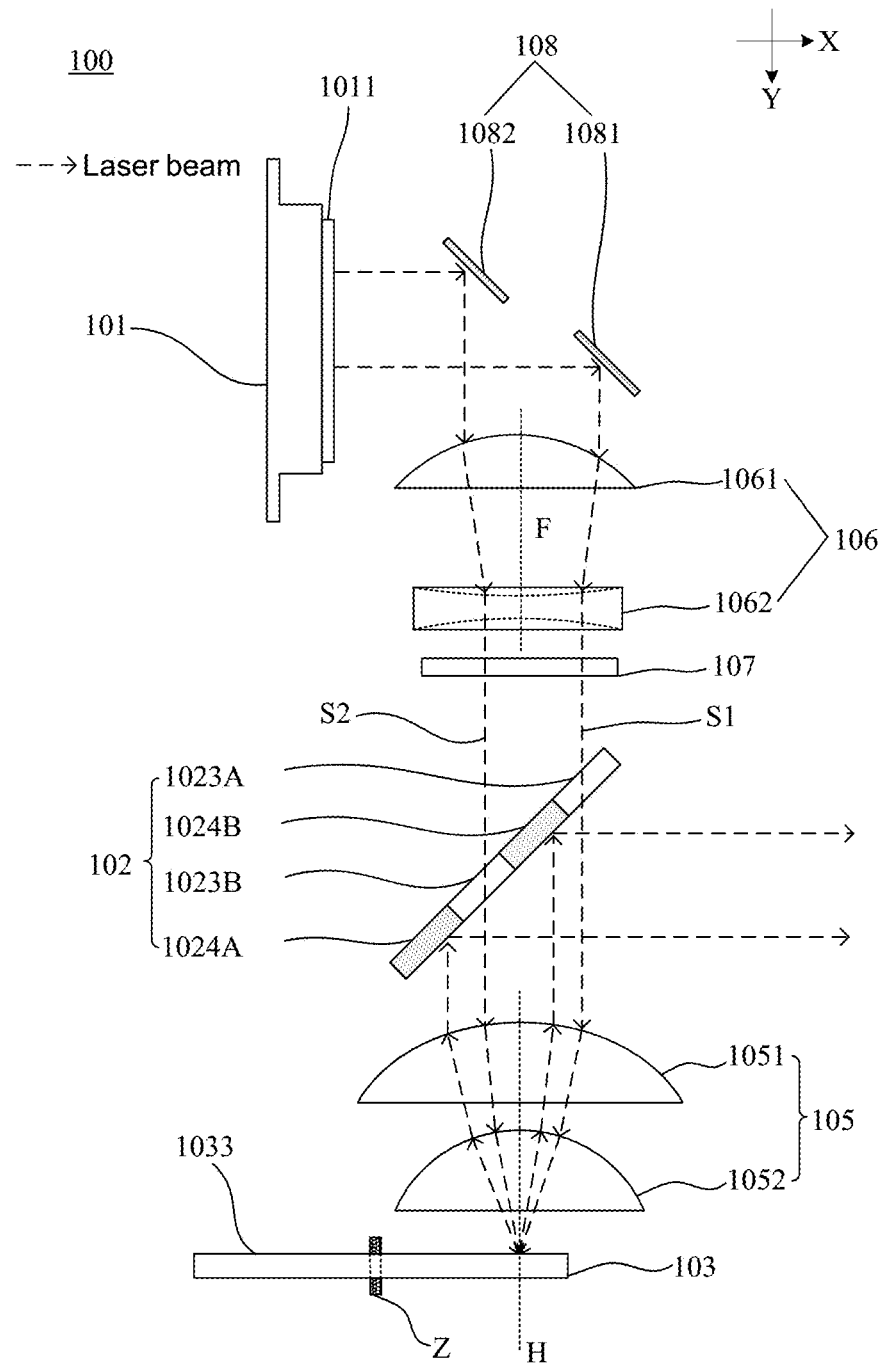
FIG. 13B is a diagram showing a beam path of yet another laser source, in accordance with some embodiments.

In some embodiments, as shown in FIG. 13B, the laser source 100 further includes a beam contraction lens group 106. The beam contraction lens group 106 is located between the turning component 108 and the combining component 102, and is configured to contract beam spots of the first laser beam S1 and the second laser beam S2 emitted by the light-emitting assembly 101. The beam contraction lens group 106 may make the laser beams exiting from the beam contraction lens group 106 thinner than the laser beams entering the beam contraction lens group 106.

In some embodiments, the beam contraction lens group 106 is a telescopic lens group. For example, the beam contraction lens group 106 includes one convex lens 1061 and one concave lens 1062. The convex lens 1061 is closer to the turning component 108 than the concave lens 1062, and a convex surface of the convex lens 1061 is convex in a direction away from the concave lens 1062.

In some embodiments, an optical axis F of the beam contraction lens group 106 is substantially collinear with the optical axis H of the converging lens group 105.

In some embodiments, neither the first laser beam S1 nor the second laser beam S2 passes through the optical axis F of the beam contraction lens group 106, and positions where the first laser beam S1 and the second laser beam S2 are incident on the beam contraction lens group 106 are asymmetrical with respect to the optical axis F of the beam contraction lens group 106.

For example, as shown in FIG. 13B, the light-emitting assembly 101 may emit two laser beams. The two laser beams are reflected by the two turning mirrors 1081 and 1082, and are incident on the beam contraction lens group 106. Neither the first laser beam S1 nor the second laser beam S2 passes through the optical axis F of the beam contraction lens group 106. After being contracted by the beam contraction lens group 106, the first laser beam S1 and the second laser beam S2 both become thin, and avoid the first reflecting portion 1024A and the second reflecting portion 1024B, and are transmitted through the first transmitting portion 1023A and the second transmitting portion 1023B to the converging lens group 105 respectively.

The first laser beam S1 and the second laser beam S2 which have been contracted are irradiated to different positions of the converging lens group 105, and are incident on a substantially same position of the phosphor wheel 103 after being converged, so as to excite the fluorescence-exciting region 1031 of the phosphor wheel 103, or be reflected by the laser-reflecting region 1032 of the phosphor wheel 103. The first laser beam S1 and the second laser beam S2 reflected by the phosphor wheel 103, and the first fluorescent beam E1 and the second fluorescent beam E2 excited by the phosphor wheel 103 all sequentially exit to the first reflecting portion 1024A and the second reflecting portion 1024A, and are reflected by the first reflecting portion 1024A and the second reflecting portion 1024B toward the beam outlet of the laser source 100, so as that the beams are sequentially output to form the illumination beams.

In some embodiments, as shown in FIG. 13B, the laser source 100 further includes a light homogenizing member 107 located between the beam contraction lens group 106 and the combining component 102. The laser beams emitted by the light-emitting assembly 101 are incident on the homogenizing member 107 after being contracted by the beam contraction lens group 106. The light homogenizing member 107 may homogenize the incident first laser beam S1 and the incident second laser beam S2, thereby homogenizing the energy density of the laser beams, which is conducive to improving the conversion efficiency of the fluorescence excitation.

In some embodiments, the light homogenizing member 107 may be a light homogenizing lens (e.g., a diffusion sheet). Alternatively, the light homogenizing member 107 may also be a fly-eye lens.

In some embodiments, the laser beams emitted by the light-emitting assembly 101 may be uniform under an action of the light homogenizing member 107 (e.g., the diffusion sheet or the fly-eye lens), so that these laser beams may generate weak interference during projection. As a result, the speckle effect of the laser projection device 1 during projection display may be reduced, the blurring of the projected image may be avoided, the display effect of the projected image may be improved, and the dizziness caused by human eyes may be reduced.

Figure 14:
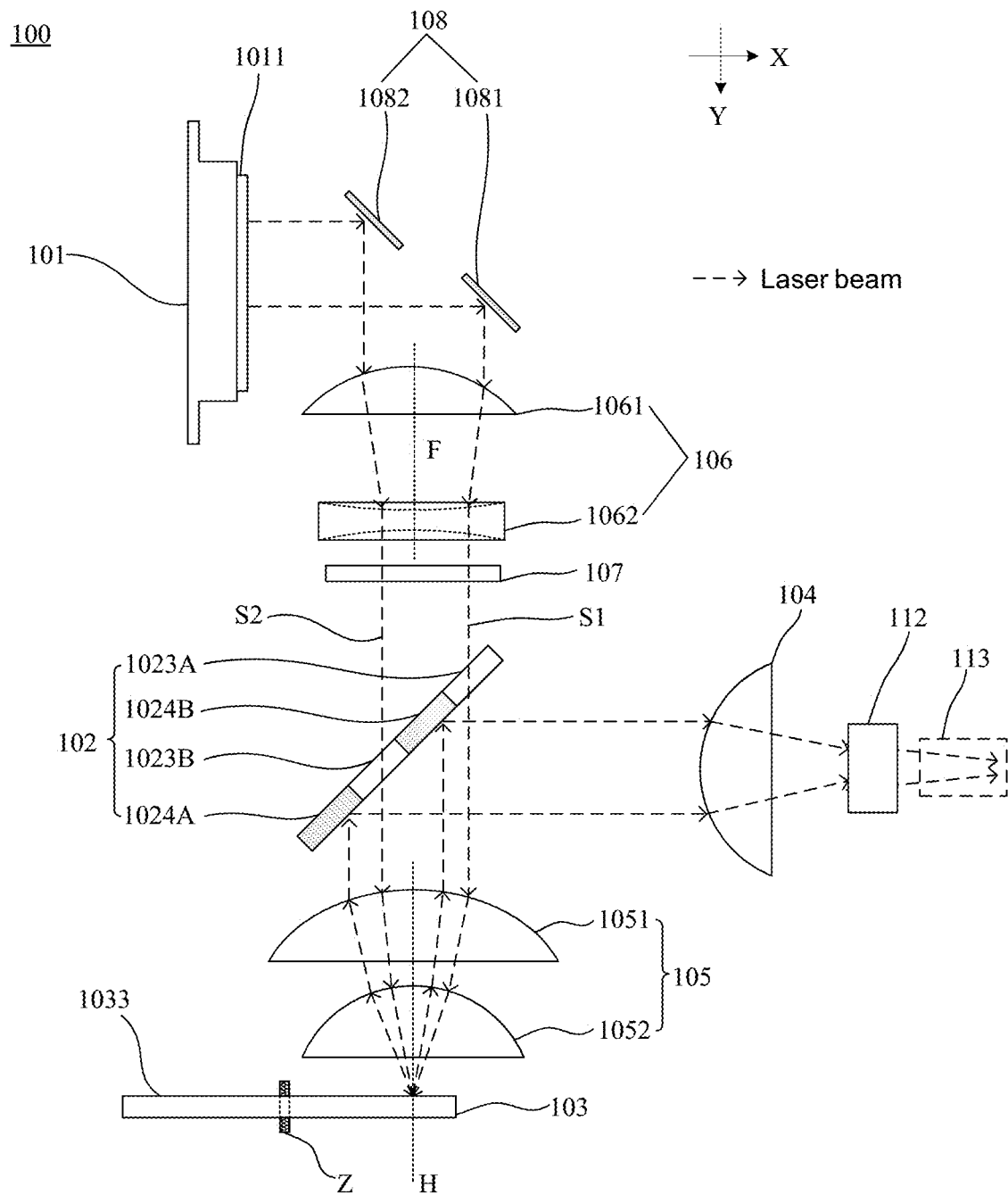
FIG. 14 is a diagram showing a beam path of yet another laser source, in accordance with some embodiments.

In some embodiments, as shown in FIG. 14, the laser source 100 further includes a light collection member 112 located at the beam outlet 113 of the laser source 100. Alternatively, the laser source 100 further includes a condensing lens 104 and a light collection member 112. The light collection member 112 is closer to the beam outlet 113 of the laser source 100 than the condensing lens 104.

In some embodiments, the two laser beams incident on the laser-reflecting region 1032 of the phosphor wheel 103 and the fluorescent beams excited by the fluorescence-exciting region 1031 are all combined by a same combining component 102 after being reflected by the phosphor wheel 103, and are all reflected by the combining component 102 toward the beam outlet 113 of the laser source 100. As a result, combination of the laser beams and the excited fluorescent beams are achieved through a compact beam path structure and a few optical elements, thereby ensuring that the volume of the laser source 100 is also small.

In addition, since the laser beams reflected by the phosphor wheel 103 and the fluorescent beams excited by the phosphor wheel 103 may be emitted to the beam outlet of the laser source 100 only once through the combining component 102, a loss of the laser beams and the fluorescent beams is reduced, and a light utilization rate is improved.

The foregoing descriptions are merely specific implementations of the present disclosure, but the protection scope of the present disclosure is not limited thereto. Any person skilled in the art could conceive of changes or replacements within the technical scope of the present disclosure, which shall be included in the protection scope of the present disclosure. Therefore, the protection scope of the present disclosure shall be subject to the protection scope of the claims.

What is claimed is:

1. A laser source, comprising:
a light-emitting assembly configured to emit a laser beam;
a converging lens group configured to converge the laser beam emitted by the light-emitting assembly;
a phosphor wheel including a fluorescence-exciting region and a laser-reflecting region; the fluorescence-exciting region being configured to generate a fluorescence beam with a color different from the converged laser beam under an excitation of the laser beam;
a combining component disposed between the light-emitting assembly and the converging lens group;
a beam contraction lens group disposed between the light-emitting assembly and the combining component;
a light homogenizing member disposed between the beam contraction lens group and the combining component; and
a turning component located between the light-emitting assembly and the combining component; wherein,
the fluorescent beam is configured to be incident on the combining component after passing through the converging lens group; the laser-reflecting region is configured to reflect the converged laser beam to the converging lens group; the laser beam is configured to be incident to the combining component after passing through the converging lens group; the combining component is configured to reflect the fluorescence beam excited by the phosphor wheel and the laser beam reflected by the phosphor wheel to a beam outlet of the laser source;
the beam contraction lens group is configured to contract a beam spot of the laser beam emitted by the light-emitting assembly;
the light homogenizing member is configured to homogenize the laser beam emitted by the light-emitting assembly; and
the light-emitting assembly emits one laser beam; and the turning component is configured to split the one laser beam to obtain a first laser beam and a second laser beam, and reflect the first laser beam and the second laser beam to the converging lens group.

2. The laser source according to claim 1, wherein the turning component is further configured to adjust a distance between the first laser beam and the second laser beam.

3. The laser source according to claim 1, wherein, the turning component includes a first turning mirror and a second turning mirror;
the first turning mirror is configured to reflect the first laser beam to the converging lens group;
the second turning mirror is configured to reflect the second laser beam to the converging lens group.

4. The laser source according to claim 3, wherein
an orthogonal projection of the first turning mirror on a laser exit surface of the light-emitting assembly does not overlap with an orthogonal projection of the second turning mirror on the laser exit surface of the light-emitting assembly;
a distance between any point of a surface of the first turning mirror proximate to the light-emitting assembly and the laser exit surface of the light-emitting assembly is not equal to a distance between any point of a surface of the second turning mirror proximate to the light-emitting assembly and the laser exit surface of the light-emitting assembly.

5. The laser source according to claim 4, wherein,
the light-emitting assembly includes a plurality of rows of light-emitting chips; the first turning mirror is disposed on beam paths of a continuous portion of rows of light-emitting chips among the plurality of rows of light-emitting chips; the second turning mirror is disposed on beam paths of a remaining portion of rows of light-emitting chips among the plurality of rows of light-emitting chips;
or
the light-emitting assembly includes a plurality of columns of light-emitting chips; the first turning mirror is disposed on beam paths of a continuous portion of columns of light-emitting chips among the plurality of columns of light-emitting chips; the second turning mirror is disposed on beam paths of a remaining portion of columns of light-emitting chips among the plurality of columns of light-emitting chips.

6. The laser source according to claim 5, wherein,
a number of rows of light-emitting chips corresponding to the first turning mirror is same as a number of rows of light-emitting chips corresponding to the second turning mirror;
or,
a number of columns of light-emitting chips corresponding to the first turning mirror is same as a number of columns of light-emitting chips corresponding to the second turning mirror.

7. The laser source according to claim 1, wherein, the combining component has a plurality of light reflecting regions and a plurality of laser transmitting regions; the plurality of light reflecting regions and the plurality of laser transmitting regions are alternately arranged;
the plurality of light reflecting regions are configured to reflect the fluorescence beam excited by the fluorescence-exciting region of the phosphor wheel and the laser beam reflected by the laser-reflecting region of the phosphor wheel to the beam outlet of the laser source;
the plurality of laser transmitting regions are configured to transmit the laser beam emitted by the light-emitting assembly, so that the laser beam is incident on the converging lens group.

8. The laser source according to claim 7, wherein the combining component includes a plurality of reflectors; a gap is provided between two adjacent reflectors; each reflector is located in a corresponding light reflecting region, and a region on a side of each reflector constitutes a laser transmitting region.

9. The laser source according to claim 7, wherein the combining component includes a plurality of reflecting portions and a plurality of transmitting portions; the plurality of reflecting portions and the plurality of transmitting portions are alternately arranged; each reflecting portion is located in a corresponding light reflecting region, and each transmitting portion is located in a corresponding laser transmitting region.

10. The laser source according to claim 9, wherein at least one surface of the plurality of transmitting portions of the combining component is further configured to reflect the fluorescence beam excited by the phosphor wheel.

11. The laser source according to claim 9, wherein
the plurality of transmitting portions and the plurality of reflecting portions are arranged in a one-to-one correspondence manner;
each transmitting portion and one corresponding reflecting portion are located at both sides of an optical axis of the converging lens group respectively; and the plurality of transmitting portions are located at both sides of the optical axis, and are asymmetrical with respect to the optical axis.

12. The laser source according to claim 7, wherein the combining component is disposed obliquely with respect to a laser receiving surface of the fluorescent wheel; the laser receiving surface is a surface of the fluorescent wheel proximate to the light-emitting assembly.

13. The laser source according to claim 1, wherein the fluorescent wheel includes:
a substrate; both the fluorescence-exciting region and the laser-reflecting region are located on a surface of the substrate proximate to the light-emitting assembly, and the fluorescence-exciting region and the laser-reflecting region are enclosed to provide a closed-loop shape.

14. The laser source according to claim 13, wherein the substrate includes a reflective substrate;
a region of the reflective substrate on which a fluorescence material layer is provided is the fluorescence-exciting region, and a region of the reflective substrate other than the fluorescence-exciting region is the laser-reflecting region.

15. The laser source according to claim 13, wherein the substrate includes a non-reflective substrate and a reflective film layer disposed on the non-reflective substrate; and
a region of the reflective film layer on which a fluorescence material layer is provided is the fluorescence-exciting region, and a region of the reflective film layer other than the fluorescence-exciting region is the laser-reflecting region.

16. A laser projection apparatus, comprising:
a laser source, the laser source being the laser source according to claim 1, and the laser source being configured to emit illumination beams;
an optical engine configured to modulate the illumination beams emitted by the laser source, so as to obtain projection beams; and
a projection lens configured to image the projection beams.

17. The laser projection apparatus according to claim 16, wherein the optical engine includes a light pipe configured to receive the illumination beams provided by the laser source and homogenize the illumination beams.

* * * * *